(12) United States Patent
Tsang

(10) Patent No.: US 9,588,490 B2
(45) Date of Patent: Mar. 7, 2017

(54) NEURAL CONTROL HOLOGRAPHY

(71) Applicant: City University of Hong Kong, Kowloon (HK)

(72) Inventor: Peter Wai Ming Tsang, Kowloon (HK)

(73) Assignee: CITY UNIVERSITY OF HONG KONG, Kowloon (HK)

(*) Notice: Subject to any disclaimer, the term of this patent is extended or adjusted under 35 U.S.C. 154(b) by 10 days.

(21) Appl. No.: 14/520,272

(22) Filed: Oct. 21, 2014

(65) Prior Publication Data

US 2016/0109851 A1    Apr. 21, 2016

(51) Int. Cl.
*G03H 1/08* (2006.01)
*G02B 27/01* (2006.01)
(Continued)

(52) U.S. Cl.
CPC ....... *G03H 1/0866* (2013.01); *G02B 27/0172* (2013.01); *G03H 1/0005* (2013.01);
(Continued)

(58) Field of Classification Search
CPC ...... G03H 1/08; G03H 1/0866; G03H 1/0005; G03H 2001/0061; G02B 27/0172; G02B 2027/0174; G02B 2027/0178; G06F 3/015
(Continued)

(56) References Cited

U.S. PATENT DOCUMENTS

| 4,140,997 A | 2/1979 | Brady |
| 4,748,669 A | 5/1988 | Klayman |

(Continued)

FOREIGN PATENT DOCUMENTS

WO    2007096610    8/2007

OTHER PUBLICATIONS

Non-Final Office Action mailed Aug. 26, 2015 for U.S. Appl. No. 14/186,706, 25 pages.
(Continued)

*Primary Examiner* — Bumsuk Won
*Assistant Examiner* — William R Alexander
(74) *Attorney, Agent, or Firm* — Amin, Turocy & Watson, LLP

(57) ABSTRACT

Neural control of holograms is provided to facilitate improving the viewing pleasure of a viewer. A holographic processor component can generate holograms representing a multi-dimensional object scene. A sensor component can detect brain waves of the viewer at different frequency bands. The holographic processor component can analyze the brain waves at difference frequency bands to determine respective strengths of the brain waves at different frequency bands. The holographic processor component can determine an adjustment(s) to be made to a parameter(s) of an optical setting associated with the holograms based on the respective strengths of the brain waves at different frequency bands. The holographic processor component can adjust the optical setting for the holograms based on the parameter adjustment(s) to facilitate generating and displaying holograms that have been modified in response to the detected brain waves at different frequency bands to facilitate customizing the holograms for the viewer.

33 Claims, 9 Drawing Sheets

(51) Int. Cl.
*G03H 1/00* (2006.01)
*G06F 3/01* (2006.01)
*G03H 1/22* (2006.01)

(52) U.S. Cl.
CPC ............ *G03H 1/08* (2013.01); *G03H 1/2294* (2013.01); *G06F 3/015* (2013.01); *G02B 2027/014* (2013.01); *G02B 2027/0118* (2013.01); *G02B 2027/0174* (2013.01); *G02B 2027/0178* (2013.01); *G03H 2001/0061* (2013.01); *G03H 2227/02* (2013.01); *G03H 2270/55* (2013.01)

(58) Field of Classification Search
USPC .................................................... 359/1, 9, 13
See application file for complete search history.

(56) References Cited

U.S. PATENT DOCUMENTS

| | | | |
|---|---|---|---|
| 4,866,774 A | | 9/1989 | Klayman |
| 4,910,778 A | | 3/1990 | Barton |
| 5,213,338 A | | 5/1993 | Brotz |
| 5,403,261 A | | 4/1995 | Shimizu et al. |
| 5,443,076 A | * | 8/1995 | Bau .................... A61B 5/04842 348/E7.082 |
| 5,892,830 A | | 4/1999 | Klayman |
| 5,970,153 A | | 10/1999 | Petroff |
| 6,097,927 A | * | 8/2000 | LaDue .............. A61M 21/0094 434/236 |
| 6,330,339 B1 | | 12/2001 | Ishige et al. |
| 6,875,167 B2 | | 4/2005 | Yoon |
| 7,010,128 B1 | | 3/2006 | Heed et al. |
| 7,127,283 B2 | | 10/2006 | Kageyama |
| 7,146,010 B1 | | 12/2006 | Heed et al. |
| 7,674,224 B2 | | 3/2010 | Hewett |
| 7,717,842 B2 | | 5/2010 | Kwon et al. |
| 7,988,557 B2 | | 8/2011 | Soderlund |
| 8,430,806 B2 | | 4/2013 | Ni et al. |
| 8,597,171 B2 | | 12/2013 | Altman et al. |
| 8,755,782 B2 | | 6/2014 | Lim et al. |
| 2010/0240945 A1 | * | 9/2010 | Bikko .................... G10L 21/00 600/28 |
| 2012/0049998 A1 | * | 3/2012 | Lim ........................ G06F 13/42 340/1.1 |
| 2013/0063550 A1 | * | 3/2013 | Ritchey .................. G03B 37/00 348/36 |
| 2013/0127980 A1 | * | 5/2013 | Haddick ................ G06F 3/013 348/14.08 |
| 2013/0278631 A1 | * | 10/2013 | Border ................ G02B 27/017 345/633 |
| 2014/0063055 A1 | * | 3/2014 | Osterhout .............. G06F 3/005 345/633 |

OTHER PUBLICATIONS

F. Gunnarsson, "Single Bipolar Loudspeaker System for Stereo Reproduction", http://www.embracingsound.com/docs/SingleBipolarLoudspeakersystemforstereoreproductionb0.91.pdf. Last accessed May 21, 2014. 10 pages.

F. Gunnarsson, "EmbracingSound™ Tech Summary," http://www.embracingsound.comldocslEmbracingSoundTechSummary.pdf. Last accessed May 21, 2014. 12 pages.

* cited by examiner

NEURAL CONTROL HOLOGRAPHY

TECHNICAL FIELD

The subject disclosure relates generally to holography, e.g., to neural control holography.

BACKGROUND

Computer generated holograms are considered by many researchers and experts to be desirable solution of the three-dimensional (3-D) display technology. A hologram, when illuminated by a coherent beam, can reconstruct a 3-D object scene it represents before the eyes of an observer. With the advancement of computing and display technology, it is now possible to generate digital holograms at video rate, e.g., over 25 frames per second, that can represent a three-dimensional (3-D) object scene. The technology is commonly referred to as "Computer Generated Holography" (CGH). When the digital holograms is presented on a high-resolution device (such as a liquid crystal on silicon (LCOS) device) and illuminated with a coherent beam, the recorded 3-D scene can be observed directly as a reconstructed holographic image. Alternatively, the reconstructed image can be projected onto a screen that can be positioned at the focal plane. If the display device is self-illuminating (e.g. a micro light-emitting diode (LED) device), an external illumination may be unnecessary.

The above-described description is merely intended to provide a contextual overview relating to holography, and is not intended to be exhaustive.

SUMMARY

The following presents a simplified summary of various aspects of the disclosed subject matter in order to provide a basic understanding of some aspects described herein. This summary is not an extensive overview of the disclosed subject matter. It is intended to neither identify key or critical elements of the disclosed subject matter nor delineate the scope of such aspects. Its sole purpose is to present some concepts of the disclosed subject matter in a simplified form as a prelude to the more detailed description that is presented later.

One or more embodiments, such as one or more systems, methods, computer readable storage mediums, and techniques disclosed herein, relate to processing and generating holograms. Disclosed herein is a system comprising at least one memory that stores computer-executable components, and at least one processor that executes or facilitates execution of the computer-executable components. The computer-executable components comprise a detector component that detects a set of signals associated with brain activity of a brain of a user, wherein the set of signals comprises at least a first signal associated with a first frequency band and a second signal associated with a second frequency band. The computer-executable components also comprise a holographic processor component that controls a set of optical parameters of an optical setting of a hologram, based at least in part on a result of an analysis of the set of signals, to generate a processed hologram for presentation to the user, wherein the processed hologram represents an object scene.

Also disclosed herein is a method that comprises receiving, by a system comprising a processing device, information relating to a set of brain wave signals associated with brain activity of a user, wherein the set of brain wave signals comprises at least a first brain wave signal associated with a first frequency band and a second brain wave signal associated with a second frequency band. The method also comprises controlling, by the system, a set of parameters of an optical setting of a hologram, based at least in part on a result of an analysis of the information relating to the set of brain wave signals, to generate a modified hologram for presentation to the user, wherein the modified hologram represents an object scene.

Further disclosed herein is a non-transitory computer-readable medium storing computer-executable instructions that, in response to execution, cause a system comprising a processor to perform operations. The operations comprise detecting a set of signals associated with brain activity of a brain of a user, wherein the set of signals comprises at least a first signal associated with a first frequency band and a second signal associated with a second frequency band. The operations also comprise managing a set of parameters of an optical setting of a hologram, based at least in part on a result of an analysis of the set of signals, to generate a modified hologram for presentation to the user, wherein the modified hologram represents an object scene.

The disclosed subject matter also includes a system comprising means for receiving information relating to a set of brain wave signals associated with brain activity of a user, wherein the set of brain wave signals comprises at least a first brain wave signal associated with a first frequency band and a second brain wave signal associated with a second frequency band. The system also comprises means for controlling a set of parameters of an optical setting of a hologram, based at least in part on a result of an analysis of the information relating to the set of brain wave signals, to generate a processed hologram for presentation to the user, wherein the processed hologram represents an object scene.

The following description and the annexed drawings set forth in detail certain illustrative aspects of the disclosed subject matter. These aspects are indicative, however, of but a few of the various ways in which the principles of the disclosed subject matter may be employed, and the disclosed subject matter is intended to include all such aspects and their equivalents. Other advantages and distinctive features of the disclosed subject matter will become apparent from the following detailed description of the disclosed subject matter when considered in conjunction with the drawings.

DETAILED DESCRIPTION

Figure 1:
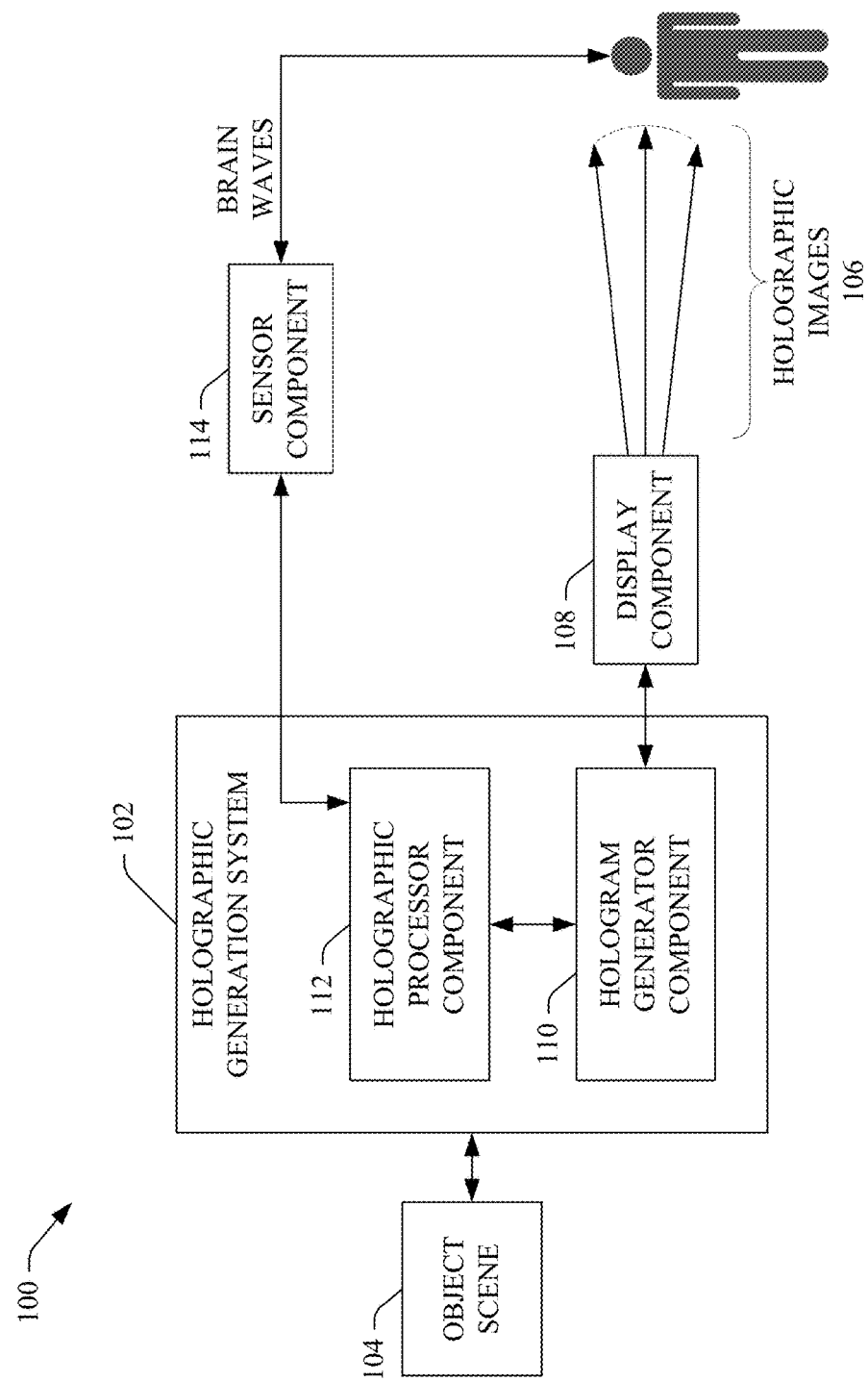
FIG. 1 illustrates a block diagram of an example system that can control visual attributes of visual images based at least in part on the brain wave signals of a user(s), in accordance with various aspects and embodiments of the disclosed subject matter.

The disclosed subject matter is described with reference to the drawings, wherein like reference numerals are used to refer to like elements throughout. In the following description, for purposes of explanation, numerous specific details are set forth in order to provide a thorough understanding of the various embodiments of the subject disclosure. It may be evident, however, that the disclosed subject matter may be practiced without these specific details. In other instances, well-known structures and devices are shown in block diagram form in order to facilitate describing the various embodiments herein.

Computer generated holograms are considered by many researchers and experts to be desirable solution of the three-dimensional (3-D) display technology. A hologram, when illuminated by a coherent beam, can reconstruct a 3-D object scene it represents before the eyes of an observer. With the advancement of computing and display technology, it is now possible to generate digital holograms at video rate, e.g., over 25 frames per second, that can represent a three-dimensional (3-D) object scene. The technology is commonly referred to as "Computer Generated Holography" (CGH). When the digital holograms is presented on a high-resolution device (such as a liquid crystal on silicon (LCOS) device) and illuminated with a coherent beam, the recorded 3-D scene can be observed directly as a reconstructed holographic image. Alternatively, the reconstructed image can be projected onto a screen that can be positioned at the focal plane. If the display device is self-illuminating (e.g. a micro light-emitting diode (LED) device), an external illumination may be unnecessary.

One advantage of a hologram over an optical image, such as an optical image taken from a digital camera, is that a hologram can record and reconstruct 3-D images. Moreover, with CGH, the 3-D effect and the focal plane of different parts of the scene can be changed numerically in the computation of the hologram through the control of the optical setting that can be comprised of a set of parameters. The parameters can control, for example, the overall distance between the object space (also known as the scene) and the hologram, depth range (e.g., distance between the nearest and the farthest points in the scene), zooming of a localized region in the scene, and/or other visual qualities or features of the hologram. For example, through changing the parameter corresponding to the focal distance of an image from the hologram, a viewer can see the image moving nearer or farther from viewer's viewpoint.

One potential application of CGH technology can be to present digital holograms on a head mount display (HMD), such as electronic glasses having computing, communication, and/or visual display functionality. Viewing holograms using an HMD, a viewer can be able to perceive depth perception, flexible adjustment of the focal distance, and/or other visual features of the holograms with basic optical accessories. HMDs are becoming increasingly popular and well-received by consumers. To make HMDs more appealing and practical, it can be desirable for HMDs to be compact in size, light weight, and power efficient, so that they can be worn and used by users with a minimal amount of burden. For example, on a typical HMD, there may not be sufficient space to accommodate a bulky variable focusing lens and power consuming electronic circuits. As a result, some observers using an HMD to view visual images (e.g., holographic images) may find the images de-focused. Also, different observers may have different preferences with regard to optical characteristics (e.g., brightness, contrast) of images. While these problems may also occur in other types of display systems as well, the adverse impact to observers can be more significant or pronounced in HMDs. Also, with regard to the displaying of 3-D images by HMDs, similar to other types of 3-D display systems, the 3-D effect may be dissatisfying or even causing discomfort to the observer, if the parameters for the hologram are not set properly.

While various parameters can be controlled manually by the observer through some manual user interface, such as a user interface comprising buttons and pointing devices, this can impose an undesirable or undue burden on the viewer, which can cause inconvenience, distraction, and/or lowering of the viewing pleasure of the viewer. It also can be likely that the observer is unable, or has found it tiring to cope with the repeated adjustment of the parameters using the manual user interface throughout the viewing period the viewer is observing the hologram.

To that end, presented are techniques for neural (e.g., brain wave) control of holograms presented by a hologram system to a user to facilitate improving the viewing pleasure of the user observing the holograms. The disclosed subject matter can perform neural induced adjustment and/or enhancement of holograms presented to the user by performing suitable processing on the holograms. In processing the holograms, the disclosed subject matter also can take into account that different users can have different expectations on the sense of viewing pleasure when viewing holograms, and also can take into account that the respective viewing pleasures of respective users can change based at least in part on a variety of factors, such as, for example, time, environment, and the respective emotions of the users (e.g., at the time a user is viewing the holograms).

A holographic processor component can generate holograms representing a multi-dimensional (3-D) object scene. A sensor component can detect brain waves of the user (e.g., the viewer) at different frequency bands. The holographic processor component can receive information relating to the brain waves of the user at the different frequency bands. The holographic processor component can analyze information relating to the brain waves of the user at the different frequency bands to determine respective strengths of the brain waves at the different frequency bands. The holographic processor component can determine (e.g., automatically or dynamically determine) one or more adjustments that can be made to one or more parameters of an optical setting associated with the holograms based at least in part on the respective strengths of the brain waves at the different frequency bands to facilitate enhancing and/or customizing the holograms being presented to the user to facilitate enhancing the viewing pleasure of the user with respect to the holograms. The holographic processor component can adjust (e.g., automatically or dynamically adjust) the optical setting for the holograms based at least in part on the one or more parameter adjustments to facilitate generating and displaying holograms that have been modified (e.g., automatically or dynamically modified) in response to the detected brain waves at the different frequency bands to facilitate enhancing and/or customizing the holograms for the user.

Turning to FIG. 1, illustrated is a block diagram of an example system 100 that can control (e.g., adaptively control) visual attributes (e.g., visual characteristics or effects) of visual images (e.g., 3-D holographic images) based at least in part on the brain wave signals of a user(s), in accordance with various aspects and embodiments of the disclosed subject matter. The system 100 can comprise a holographic generation system 102 that can desirably generate a complex hologram (e.g., a complex hologram of a sequence of 3-D holographic images) or a phase hologram (e.g., a phase-only hologram (POH)) that can represent a 3-D object scene 104 (e.g., real or computer-synthesized 3-D object scene) from multiple different viewing perspectives that can correspond to multiple different viewing perspectives of the original 3-D object scene 104. A complex hologram (e.g., a complex amplitude hologram) is a hologram that can comprise a magnitude component or portion (e.g., an amplitude magnitude component or portion), which can have a magnitude value, and a phase component or portion, which can have a phase value. A phase hologram (e.g., POH, phase-specific hologram, or pure phase hologram) can have a phase component or portion that can have a phase value, wherein the magnitude component or portion has been removed or has had its magnitude value set to a defined value (e.g., unity value). The holographic generation system 102 can use a complex hologram or phase hologram to generate, reconstruct, or reproduce 3-D holographic images 106 for display to one or more viewers, wherein the 3-D holographic images can represent or recreate the original 3-D object scene 104 from multiple visual perspectives.

In some embodiments, the holographic generation system 102 and/or other components (e.g., display component 108) of the system 100 can be part of a multiple-view aerial holographic projection system (MVAHPS) that can generate and display a 3-D holographic image(s) of a 3-D real or synthetic, static or animated, object scene viewable from multiple perspectives (e.g., multiple angles in relation to the 3-D object scene), wherein the 3-D holographic image(s) 106 can be viewed, for example, as a 3-D image(s) floating in mid-air in a desired display area (e.g., 3-D chamber) associated with the display component 108. The holographic generation system 102 and display component 108 (e.g., a SLM or LCoS display device, which can be a phase-only or phase-specific display device, or a display device that can display complex holograms) can facilitate generating and displaying holograms (e.g., complex holograms, phase holograms) at video rate in real time or near real time (e.g., facilitate generating a complex hologram, converting the complex hologram to a phase hologram (e.g., when phase holograms are desired), and displaying, for example, 2048×2048-pixel holographic images (or larger-sized hologram), each of which can represent 4 million object points (or more), at approximately 40 frames per second or faster, in real time or near real time).

In certain embodiments, the holographic generation system 102 and/or other components, such as, for example, the display component 108, of the system 100 can be part of an electronic device, such as an HMD (e.g., electronic glasses having computing, communication, and/or visual display functionality), a mobile phone (e.g., a smart phone), an electronic tablet, or other electronic device having computing, communication, and/or visual display functionality. The holographic generation system 102 can generate a 3-D holographic image(s) of a 3-D real or synthetic, static or animated, object scene viewable from multiple perspectives (e.g., multiple angles in relation to the 3-D object scene), wherein the 3-D holographic image(s) 106 can be viewed, for example, as a 3-D image(s) floating in mid-air in a desired display area associated with the display component 108. The display component 108 can display the holograms at video rate in real time or near real time, wherein the generation, conversion (e.g., conversion from complex to phase hologram), and display of the hologram can be performed at video rate or faster, in real or near real time (e.g., the hologram can be generated or converted, and 2048×2048-pixel or larger holographic images, each of which can represent 4 million object points (or more), can be displayed, at approximately 40 frames per second or faster, in real time or near real time).

The holographic generation system 102 can comprise a hologram generator component (HGC) 110 that can be employed to generate complex and/or phase holograms that can represent an object scene. The HGC 110 can receive (e.g., obtain) a real 3-D object scene (e.g., captured 3-D object scene), or can generate or receive a synthetic 3-D object scene (e.g., computer generated 3-D object scene). In some implementations, the HGC 110 can generate or receive a computer generated 3-D object scene that can be realized (e.g., generated) using numerical means without the presence of a physical or real-world 3-D object scene. Based at least in part on the real or synthetic 3-D object scene, the HGC 110 can generate holograms, wherein the generated holograms (e.g., full-parallax 3-D Fresnel holographic images) can represent or recreate the original 3-D object scene from multiple visual perspectives (e.g., multiple viewing angles).

In some implementations, the HGC 110 can generate model data that can represent the 3-D object scene from a desired number of viewing perspectives, based at least in part on received or generated information regarding the original 3-D object scene from multiple visual perspectives. The HGC 110 also can convert the model data to generate digital holographic data for the 3-D hologram that can be used to facilitate generating and displaying 3-D holographic images that can represent or recreate the original 3-D object scene from multiple visual perspectives.

The HGC 110 can employ any of a variety of techniques or processes to facilitate generating complex 3-D holograms of a 3-D object scene at video rate (e.g., approximately 30 frames per second) or faster or in real or near real time. For instance, in some implementations, the HGC 110 can generate holograms, such as digital mask programmable holograms (DMPHs) that can be complex holograms that can be different from the classical digital Fresnel holograms. A DMPH can mimic a high-resolution hologram, but also can be displayed using display devices that can have considerably lower resolution. The HGC 110 can produce a DMPH by the superposition of two images. For instance, the HGC 110 can produce a DMPH that can comprise a static, high-resolution grating (e.g., a static high-resolution image) and a lower-resolution mask (e.g., a lower-resolution image), wherein the lower-resolution mask can be overlaid onto or superpositioned with the high-resolution grating. The HGC 110 can generate a DMPH such that the reconstructed holographic image of the DMPH can be programmed to approximate a target image (e.g., planar target image), including both intensity and depth information, by configuring the pattern of the mask. Employing such fast hologram techniques relating to DMPHs, the HGC 110 can facilitate generating complex holograms at video rate in real or near time (e.g., facilitate generating and displaying, for example, a 2048×2048-pixel hologram, which can represent 4 million object points, at 40 frames per second or faster in real or near real time).

In certain implementations, the HGC 110 can facilitate quickly generating (e.g., at video rate of faster) complex holograms in part, for example, by downsampling information representing an object scene by a defined factor, generating an intermediate object wavefront recording plane (WRP) or an interpolative wavefront recording plane (IWRP) for a 3-D image of a 3-D object scene and/or using a look-up table(s) to store wavefront patterns of square regions of the 3-D image, and further processing (e.g., expanding, interpolating, etc.) the WRP or IWRP to facilitate generating holographic images that can represent the original object scene. Employing such fast hologram generation techniques or processes, the HGC 110 can facilitate generating a complex hologram (e.g., a 2048×2048-pixel complex hologram, which can represent 4 million object points) at 40 frames per second or better. The HGC 110 can efficiently generate complex full-parallax 3-D Fresnel holograms that can represent less than 4 million object points, 4 million object points, or more than 4 million object points, at less than 40 frames per second, 40 frames per second, or more than 40 frames per second. The fast hologram generation techniques or processes, as disclosed herein, are merely a few of a number of fast hologram generation techniques or processes that can be employed to facilitate generating a complex hologram (e.g., a 2048×2048-pixel hologram, which can represent 4 million object points) at 40 frames per second or faster in real or near real time.

In accordance with various implementations, if it is desired to convert a complex hologram to a phase hologram, the HGC 110 can employ one or more hologram conversion processes (and associated algorithms), such as a localized error diffusion and redistribution (LERDR) process, a bidirectional error diffusion (BERD) process, or a unidirectional error diffusion (UERD) process, to convert a complex hologram to a phase hologram. For example, for a complex Fresnel hologram representing a 3-D object scene 104, the HGC 110 can directly apply the LERDR process to the complex hologram to facilitate converting the complex hologram into an LERDR hologram. As part of the LERDR process, the HGC 110 can partition the complex hologram into segments, convert the complex values of the pixels in each segment to phase-only values, and apply error diffusion to each of the segments to diffuse the error to certain neighboring pixels (e.g., certain neighboring pixels that have not yet been visited or processed by the HGC 110) to facilitate generating the phase hologram. For example, the HGC 110 can scan the pixels in the complex hologram sequentially in a segment by segment manner and a row by row manner. The HGC 110 can modify or force the magnitude of each visited (e.g., scanned) pixel to a desired constant magnitude value, while preserving the exact or actual phase value of each pixel. The HGC 110 also can apply error redistribution to the last pixel of each segment to produce the resulting LERDR hologram, which can be displayed, for example, on the display component 108 (e.g., a phase-only display device). As part of the LERDR process, the HGC 110 can scan and process the pixels in respective segments in parallel. The HGC 110 can generate holograms or portions (e.g., segments) thereof, in parallel, for example, by using a graphic processing unit (GPU) or a field programmable gate array (FPGA) to facilitate performing the calculations relating to hologram generation or converting complex holograms to phase holograms.

With regard to the BERD hologram, the HGC 110 can receive or generate a complex Fresnel hologram representing a 3-D object scene 104. The HGC 110 can directly apply the BERD process to the complex Fresnel hologram to facilitate converting the complex Fresnel hologram into a phase-only hologram. For example, the HGC 110 can scan the pixels in the complex hologram sequentially in a row by row manner. For instance, the HGC 110 can scan the odd and even rows from opposite directions, which can constitute part of the BERD process. The HGC 110 can modify or force the magnitude of each visited (e.g., scanned) pixel to a desired constant magnitude value, while preserving the exact or actual phase value of each pixel. The HGC 110 can facilitate diffusing the resulting error to the neighboring pixels of the complex hologram that have not been visited before by the hologram processor component to that point. Alternatively, in some implementations, the HGC 110 can facilitate directly applying the UERD process to the complex hologram to facilitate converting the complex hologram into a phase hologram, wherein each of the rows can be scanned in the same direction.

The holographic generation system 102 also can comprise a holographic processor component (HPC) 112 that can be associated with the HGC 110 to facilitate controlling generation and presentation of the holograms (e.g., reconstructed holographic images from the holograms). The system 100 also can comprise a sensor component 114 that can be associated with the holographic generation system 102, including the HPC 112. The sensor component 114 can detect (e.g., sense) brain wave signals in different frequency bands of a user (e.g. observer) viewing reconstructed holographic images 106 that can represent an object scene 104 (e.g., 2-D or 3-D object scene).

In processing (e.g., modifying) the holograms, the HPC 112 also can take into account that different users can have different expectations on the sense of viewing pleasure when viewing the reconstructed holographic images 106, and also can take into account that the respective viewing pleasures of respective users can change based at least in part on a variety of factors, such as, for example, time, environment, and the respective emotions of the users (e.g., at the time a user is viewing the reconstructed holographic images 106). Also, with regard to the disclosed subject matter, it is not necessary for the user (e.g., observer) to have any prior knowledge on how to adjust the parameters of the optical setting applied to holograms to attain the desired expectation of the user, wherein the desired optical setting generally can vary with different object scenes represented in holograms, the viewing environment of the user, the apparatus on which the holograms are being presented, or the mood of the user, for example. This is because the HPC 112 can perform the desired adjustment or setting of the parameters of the optical setting to be applied to the holograms dynamically or automatically based at least in part on the user's response (e.g., sub-conscious response or, optionally, conscious response) to viewing the holograms. The HPC 112 can adjust (e.g., automatically or dynamically adjust) the parameters of the optical setting of holograms to adjust the optical characteristics (e.g., focus, zoom level, depth, 3-D effect, brightness, contrast) of the reconstructed holographic images 106, and, as a result, it is not necessary for the display to have a variable focusing lens system or other such lens system, or the associated electronic hardware for such lens systems.

It is to be appreciated though that the user also can consciously respond to the holograms to actively (e.g., intentionally, deliberately) control or influence the optical setting applied to the holograms, for example, by invoking certain mental activities (e.g., such as by the user deliberately increasing or decreasing the user's attention to the holograms), wherein the HPC 112 can receive the brain wave signals in different frequency bands of the user relating to the conscious response of the user to viewing the holographic images, and the HPC 112 can adjust the parameters of the optical setting to be applied to the holograms based at least in part on the user's conscious response to viewing the holograms. It also is to be appreciated though that, in some implementations, the HPC 112 can provide the user an interface (e.g., buttons, controls, dials) that can enable the user to manually adjust the parameter settings of the parameters of the optical setting to be applied to the holograms to facilitate manual manipulation of the schematic and veridical expectations of the user with respect to viewing the holographic images representing the object scene.

In some implementations, the sensor component 114 can comprise one or more sensors that can be associated with the brain and/or body of a user (e.g., a hologram observer) to facilitate monitoring and detecting information relating to brain wave signals and/or physical signals (e.g., facial and/or body reactions) of the user in response to viewing the holographic images 106 and/or other stimuli experienced by the user. For instance, the one or more sensors of the sensor component 114 can be wirelessly associated with (e.g., wirelessly connected to) the user such that the one or more sensors can sense, detect, and/or capture the brain wave signals or other physical signals of the user by being in contact with the user or in proximity to the user.

The sensor component 114 can comprise one or more sensors that can monitor and detect a mental or emotional state of a user in connection with the user viewing the reconstructed holographic images 106 and/or experiencing other stimuli in connection with the presentation of the reconstructed holographic images 106 to the user. For example, the sensor component 114 can comprise one or more sensors that can monitor and detect brain wave signals in different frequency bands of a user in connection with the user viewing or experiencing the reconstructed holographic images 106 by using electroencephalography (EEG) technology, magnetoencephalography (MEG) technology, or other brain-wave-detection technology. For a user, the brain wave signals in different frequency bands typically can vary (e.g., the signal strengths of brain wave signals in different frequency bands can vary) in response to viewing the holograms (or modified or processed holograms) and/or in response to other stimuli perceived or experienced by the user while viewing the holograms (or modified or processed holograms). The sensor component 114 also can comprise one or more sensors that can monitor and detect physical signals (e.g., facial expressions, eye responses, hand gestures, bodily movements, pulse, blood pressure, or other physical attributes) of the user in response to viewing the holographic images 106 or other stimuli in connection with the presentation of the holographic images 106 to the user.

In accordance with various implementations, the one or more sensors of the sensor component 114 can be part of (e.g., integrated with) an electronic device, such as an HMD (e.g., electronic glasses having computing, communication, and/or visual display functionality), a mobile phone (e.g., a smart phone), an electronic tablet, a computer, earbuds or earphones that can be associated with (e.g., wired or wirelessly communicatively connected to) an HMD, a mobile phone, an electronic tablet, a computer, or another type of electronic device. The set of earbuds or earphones can be connected via a wireline or wireless communication connection to an electronic device (e.g., mobile phone, electronic pad or tablet, computer, audio player, etc.) and/or to the HPC 112. As another example, one or more sensors of the sensor component 114 can be integrated into the arms, end pieces, or frame of an HMD, such as a pair of electronic glasses, worn by the user while perceiving the holograms presented by the holographic generation system 102 to the user, wherein the one or more sensors can be connected via a wireless or wireline communication connection to another electronic device (e.g., mobile phone, electronic pad or tablet, computer, audio player, etc.) and/or to the HPC 112. In other implementations, one or more of the sensors of the sensor component 114 can be separate from, but associated with (e.g., wired or wirelessly communicatively connected to), an electronic device.

Employing the one or more sensors, the HPC 112 and/or sensor component 114 can detect or determine a mental, an emotional, and/or a physical level(s) or state(s) of the user in connection with viewing the holographic images 106, a change in the mental, emotional, and/or physical level(s) or state(s) of the user in connection with viewing the holographic images 106, a response (e.g., a mental, emotional, or physical response) of the user in connection with viewing the holographic images 106, or a change in the response of the user with respect to viewing the holographic images 106. For example, the HPC 112 and/or sensor component 114 can detect or determine a level of attentiveness (e.g., attentive, or less or casual attentiveness) with respect to viewing the holographic images 106, a change in the level of attentiveness of the user with respect to viewing the holographic images 106, a focal point of attention of the user with respect to viewing the holographic images 106 (e.g., an attention to a certain portion or object(s) in the object scene represented by the holographic images 106), a change in the focal point of attention of the user with respect to viewing the holographic images 106, a level of enjoyment (e.g., a higher level of enjoyment, or a lower level of enjoyment or disenjoyment) of the user with respect to viewing the holographic images 106, a change in the level of the enjoyment of the user with respect to viewing the holographic images 106, a level of comfort (e.g., comfort or discomfort) of the user while viewing the holographic images 106, or a change in the level of the comfort of the user while viewing the holographic images 106, among other mental, emotional, or physical responses or states of the user that the HPC 112 and/or sensor component 114 can detect or determine in response to monitoring the user.

The HPC 112 can receive information relating to the brain wave signals in different frequency bands of the user from the one or more sensors of the sensor component 114. To facilitate neural (e.g., brain wave) control of holograms presented by a hologram system to a user, the HPC 112 can control generation of holograms, including modification of holograms, and can facilitate reconstruction of holographic images (e.g., reconstructed holographic images 106) that can be modified, based at least in part on information relating to the mental, emotional, or physical responses or states of the user as sensed by the sensor component 114, to facilitate improving the viewing pleasure of the user as the user is observing the holographic images.

The HPC 112 can analyze information relating to the brain waves of the user at the different frequency bands to determine respective strengths (e.g., respective strength levels, amplitudes, or magnitudes) of the brain waves at the different frequency bands. For example, the information relating to the sensed brain wave signals can comprise information relating to the respective magnitudes of alpha brain waves and beta brain waves of the user, and the HPC 112 can analyze such information determine the respective magnitudes of the alpha brain waves and beta brain waves of the user. The mental or emotional state of the user can be reflected from the respective strengths of different frequency bands of the brain wave of the user. Different frequency components of the brain wave of a user can reflect different states (e.g., mental or emotional states) of the mind of the user. For instance, the beta waves can be taken to reflect stress, and the alpha waves can be taken to reflect relaxation. The brain waves of the user (e.g., listener) can be employed by the HPC 112 to decipher the response of the user, for example, to viewing the holographic images 106 corresponding to the holograms. For example, a strong beta wave can indicate violation of the expectation of the user in response to viewing the holographic images 106, while a strong alpha wave can be an indication of habituation (e.g., boredom) in response to viewing the holographic images 106.

Based at least in part on the results of the analysis, including the respective strengths of the brain wave signals in the respective frequency bands, the HPC 112 can determine (e.g., automatically or dynamically determine) parameter settings, and/or determine one or more adjustments that can be made to the parameters settings, for one or more parameters (e.g., focal distance, brightness, depth range, zoom level) of the optical setting associated with the holograms. For instance, the HPC 112 can translate the respective strengths of the brain wave signals in the respective frequency bands into the parameter settings for the parameters of the optical setting associated with the holograms. In some implementations, the HPC 112 can comprise and/or generate a mapping of respective brain wave signal strengths for respective (e.g., different) frequency bands to respective parameters settings of respective parameters of an optical setting to be used when generating or modifying holograms, in accordance with defined hologram enhancement criteria (e.g., to facilitate the translating the respective strengths of the brain wave signals in the respective frequency bands into the parameter settings for the parameters of the optical setting). Such controlling of the parameter settings of the optical setting by the HPC 112 can facilitate enhancing and/or customizing the holograms being presented to the user to facilitate enhancing the viewing pleasure of the user with respect to the holograms. As another example, as part of the analysis, the HPC 112 also can determine, identify, or infer a facial expression, a gesture (e.g., hand or finger gesture), eye response, etc., of the user in response to perceiving the holographic images 106, and can determine an adjustment(s) that can be made to one or more parameters of the optical setting to be applied to the holograms to modify the holograms (and corresponding holographic images 106), based at least in part on the analysis results relating to the facial expression, gesture, eye response, etc., of the user, to facilitate improving the viewing pleasure of the user.

The HPC 112 can adjust or set (e.g., automatically or dynamically adjust or set) the optical setting for the holograms based at least in part on the one or more parameter adjustments or settings determined by the HPC 112 in response to analyzing the brain wave signals in different frequency bands of the user. The HPC 112 and/or the HGC 110 can apply the one or more parameter adjustments or settings to the optical setting, which can be applied to the holograms to modify the holograms to generate a modified hologram. The HGC 110 and/or display component 108 can generate holographic images 106 (e.g., modified holographic images), based at least in part on the modified holograms, and the holographic images 106 can be displayed by the display component 108 for viewing by the user.

Various aspects of the disclosed subject matter will now be further described. As disclosed, a hologram, when illuminated by a coherent beam, can reconstruct a 3-D scene it represents before the eyes of an observer. Being different from a 2-D optical image, for example, the picture one can observe on a television or a computer monitor, a hologram can display a 3-D image with a given set of optical characteristics (e.g. focal distance, brightness, and/or other optical characteristics) without the need of lens systems and electronic control circuits. Instead, the HPC 112 can incorporate, adjust, or set the optical characteristics of the hologram during the numerical generation of the hologram through the assignment of a set of parameters (e.g., optical parameters), such as, but not limited to, the example optical parameters included in Equation (1), wherein H(x,y) can denote the hologram and I(u,v) can denote the intensity of a pixel at location (u,v) on the image plane. Based on the classical Fresnel diffraction equation, the hologram H(x,y) can be represented numerically by, and can be generated by the HPC 112 and/or HGC 110 in accordance with (e.g., using), Equation (1) as follows:

$$H(x, y)|_{\substack{0 \le x < X \\ 0 \le y < Y}} = \sum_{u=0}^{X-1} \sum_{v=0}^{Y-1} \frac{I(u, v)\exp(i2\pi r_{u;v;x;y}/\lambda)}{r_{u;v;x;y}}, \quad (1)$$

wherein I(u,v) can be the intensity of the point located at (u,v) in the 3-D scene and $r_{u;v;x;y} = \sqrt{((x-u)^2\delta^2+(y-v)^2\delta^2+w_{u;v}^2)}$ can be the distance of the point located at (u,v) to the hologram, the perpendicular distance of a point at position (u,v) on the image scene to the hologram can be denoted by $w_{u;v}$, λ can be the wavelength of the optical beam, δ can be the pixel size of the hologram, and X and Y are the number of rows and columns of the hologram, respectively, and wherein, without loss of generality, X and Y can be assumed to respectively be the same as the number of rows and columns contained in the original object scene (e.g., the original captured or generated image of the object scene).

As disclosed herein, the HGC 110 and/or display component 108 can illuminate the hologram with a coherent light beam to generate holographic images 106 that can reconstruct the source image (e.g., object scene 104). From Equation (1), it can be observed that the optical characteristics of the source image can be changed (e.g., modified, adjusted) by varying the parameters in the computation of the hologram. For example, the HPC 112 can adjust or scale the parameter $w_{u;v}$ (e.g., the hologram-to-object space distance parameter) to control the overall distance between the object space (e.g., the object scene) and the hologram, and can adjust or scale (e.g., uniformly or regionally adjust or scale) the intensity or brightness parameter I(u,v) to control the brightness of the image. By the same principle, the HPC 112 can modify or vary an optical parameter (e.g., a zoom parameter) of the optical setting of the hologram to zoom in to or zoom out of a localized region of the hologram (e.g., a localized region of a scene represented in the hologram), to reveal different levels of details with respect to one or more objects of the scene that are represented in the hologram.

However, if the optical settings are not appropriate, they may cause discomfort to an observer who is observing the hologram. For instance, an undesirable (e.g., improper, unsuitable) setting of the focal distance in the hologram can lead to blurring of the reconstructed image. Unfortunately, due to the relatively high diversity of the visual characteristics that can determine or influence the reconstructed image associated with the hologram and how it is perceived by candidates (e.g., different observers) as well as the preferences of different candidates, a uniform optical setting for a hologram often may not result in reconstructed holographic images that have visual characteristics that are desirable to all candidates viewing the reconstructed holographic images. While various parameters can be controlled by the observer through some user interface (e.g., manual user interface), this may impose an undesirable burden on a candidate, cause inconvenience to the candidate, distraction to the candidate, and/or lower the viewing pleasure of the candidate with respect to the hologram. Also, the candidate may be unable, and/or may find it arduous, to cope with or handle the regular (e.g., frequent) manual adjustments of the optical settings of the hologram throughout the viewing period in order to achieve or maintain a desired presentation of the hologram (e.g., maintain desired visual characteristics of the reconstructed holographic images while viewing them).

To overcome these and other deficiencies in the conventional approaches to generating and presenting visual images, such as holographic images, the disclosed subject matter (e.g., via the HPC 112) can employ a number of techniques that can enable an observer of a hologram to subconsciously or consciously exert control over various parameters in the optical setting of the hologram through the observer's mental state with respect to and/or physical reaction to the presentation of the hologram and/or other experienced stimuli. The HPC 112 can detect the brain waves (e.g., brain wave signals) at different frequency bands (e.g. using EEG or MEG) from a user (e.g., an observer) via the sensor component 114. The HPC 112 can analyze the signals in one or more of the frequency bands, and can determine one or more parameters for the optical setting associated with the hologram based at least in part on the results of the analysis. The HPC 112 can adjust or set the one or more parameters of the optical setting for the hologram, in accordance with the parameter determination. The adjustment or setting of the parameters of the optical setting can be performed by the HPC 112 based at least in part on the brain wave signals in different frequency bands associated with the subconscious brain activity of the user. In such case, the HPC 112 can control, for example, the 3-D effect or other visual characteristics on the reconstructed holographic images 106 of the holograms to follow the mental state or emotion of the user in essentially an autonomous manner with respect to the user. As desired, the user also can modify the user's brain waves intentionally by invoking certain mental activities, such as, for example, by deliberately increasing or decreasing the user's attention with respect to viewing the hologram. Whether the brain activity of the user is subconscious or conscious, the HPC 112 can detect the brain wave signals in different bands of the user, determine one or more parameters for the optical setting associated with the hologram based at least in part on the results of the analysis of the brain wave signals in the different bands, adjust or set the one or more parameters of the optical setting for the hologram based at least in part on the parameter determination, and can modify the hologram to generate a processed (e.g., modified, enhanced) hologram based at least in part on one or more parameters of the optical setting to facilitate presenting a hologram enhanced to improve the viewing pleasure of the user. The control of the hologram generation process by the HPC 112 based at least in part on the brain wave signals can be virtually unlimited, as it may only be limited by the imagination (e.g., the subconscious or conscious imagination) of the user.

In the disclosed subject matter, a number of example embodiments or implementations are described. However, it is to be understood that the disclosed subject matter is not so limited, and the same principles described herein with regard to the example embodiments and implementations can be applied to control other aspects of the hologram generation process, and such other aspects of the hologram generation process are deemed to be part of the disclosed subject matter.

In accordance with an embodiment, the HPC 112 can modify the overall intensity of a reconstructed holographic image 106, based at least in part on the brain wave signals in the different bands, for example, in accordance with (e.g., using) Equation (2) as follows:

$$H(x, y)|_{\substack{0 \le x < X \\ 0 \le y < Y}} = \sum_{u=0}^{X-1} \sum_{v=0}^{Y-1} \frac{I(u, v)C(V)\exp(i2\pi r_{u;v;x;y}/\lambda)}{r_{u;v;x;y}}. \quad (2)$$

wherein in Equation (2), V can be a single or multi dimensional variable that can encapsulate different attributes of the brain wave signal of a user. For example, with regard to Equation (2), V can be composed of the average magnitude of the alpha wave and the beta wave of the brain wave signal of the user, and C(V) can be a function of the variable V. There can be numerous combinations in the choosing of the ingredients of V, and the function C(V). For purposes of illustration, an example is presented herein. Suppose A and B denote the average magnitude of the alpha wave and the beta wave of the brain wave signal of the user, and the function C(V) is given by Equation (3) as follows:

$$C(V) = \frac{B}{A}. \quad (3)$$

The HPC 112 can control (e.g., modify) the intensity of the reconstructed holographic image 106, by adjusting or setting one or more intensity parameters of the optical setting, for example, to make it brighter when the HPC 112 determines that the user is in an attentive state with respect to the hologram (which can increase the magnitude of the user's beta wave, wherein the HPC 112 can detect such increase in the magnitude of the user's beta wave), and this can result in a clearer holographic image. When the HPC 112 determines the user is in a normal viewing state (wherein the user may only be casually glimpsing at or viewing the hologram), for example, when the HPC 112 detects an increasing magnitude of the user's alpha wave, in response, the HPC 112 can reduce the intensity of the reconstructed holographic image, by adjusting or setting one or more intensity parameters of the optical setting, which can reduce the stress on the eyes of the user.

In accordance with another embodiment, the HPC 112 can control (e.g., modify) the focal distance of the reconstructed holographic image, by adjusting or setting one or more focal-distance parameters of the optical setting, based at least in part on the detected brain wave signal in different frequency bands of the user. For instance, the HPC 112 and/or HGC 110 can generate the hologram, for example, using Equation (1), and the parameter $r_{u;v;x;y}$ can be redefined, in accordance with (e.g., using) Equation (4), as follows:

$$r_{u;v;x;y} = \sqrt{\left((x-u)^2\delta^2 + (y-v)^2\delta^2 + \left[\frac{W_{u;v}}{C(V)}\right]^2\right)}. \quad (4)$$

wherein, without loss of generality, the definitions of V and C(V) can be the same as that in the example of the embodiment disclosed above with regard to Equations (2) and (3). When the user is in an attentive state (e.g., when the user is trying to see more details in the 3-D scene represented by the reconstructed holographic images 106), C(V) can be increased and the HPC 112 can control the generation or adjustment of a reconstructed holographic image 106 to adjust the focus of the reconstructed holographic image 106 such that the reconstructed holographic image 106 can be brought nearer to the user to provide the user the ability to more closely inspect the object scene represented in the reconstructed holographic image 106. When the user is in a less attentive state with respect to the hologram, the HPC 112 can determine that C(V) is decreased, based at least in part on the detected brain wave signals indicating that the user is in a less attentive state. In response, the HPC 112 can control the generation or adjustment of a reconstructed holographic image 106 to adjust the focus of the reconstructed holographic image 106 (e.g., by adjusting or setting one or more focus parameters of the optical setting) such that the reconstructed holographic image 106 can be placed further away from the user, which can cause less strain to the eyesight of the user.

In accordance with other embodiments, the HPC 112 can control the generation or adjustment of a reconstructed holographic image 106 to adjust the focusing (e.g., auto-focusing) of the reconstructed holographic image 106 (e.g., by adjusting or setting one or more focusing parameters of the optical setting) based at least in part on the detected brain wave signals in different frequency bands of the user, such as brain wave signals relating to the level of attentiveness of the user with respect to the hologram. For instance, the HPC 112 can control the generation or adjustment of the reconstructed holographic image 106 to adjust the focusing (e.g., auto-focusing) of the reconstructed holographic image 106, wherein the reconstructed 3-D scene from the hologram can be brought nearer to the user (and/or can zoom into a smaller area of the reconstructed holographic images 106) when it is determined that the user is watching more attentively (e.g., user is focusing on the reconstructed holographic images 106 more intently), or can be placed farther away from the user (and/or can include a wider coverage of the object scene), when it is determined that the user is watching less attentively (e.g., casually and/or in a relaxed manner), as determined by the HPC 112 based at least in part on an analysis of information relating to the detected brain wave signals in different frequency bands of the user.

In accordance with still other embodiments, the HPC 112 can control the generation or adjustment of a reconstructed holographic image 106 to adjust (e.g., increase, decrease) the intensity of the 3-D effect of the reconstructed holographic image 106 (e.g., by adjusting or setting one or more 3-D-effect intensity parameters of the optical setting) to suit the comfort and anticipation of the user, based at least in part on the brain wave signals in different frequency bands of the user. For example, if the HPC 112 determines that the user is experiencing, or at least appears to be experiencing a certain level of discomfort while viewing the reconstructed holographic images 106, based at least in part on the user's brain wave signals, in response, the HPC 112 can vary the intensity of the 3-D effect of the reconstructed holographic images 106 to a different intensity level to facilitate improving the comfort level of the user while the user is viewing the reconstructed holographic images 106.

In accordance with still other embodiments, the HPC 112 can control the generation or adjustment of a reconstructed holographic image 106 to adjust (e.g., increase, decrease) the zoom level of all or a portion of the 3-D object scene represented in the reconstructed holographic image 106 (e.g., by adjusting or setting one or more zoom parameters of the optical setting) based at least in part on the detected brain wave signals in different frequency bands of the user. For example, in response to the HPC 112 determining that the user has focused attention on a certain portion of the 3-D object scene represented in the reconstructed holographic images 106 (e.g., based at least in part on the user's brain wave signals), the HPC 112 can increase the zoom level for that certain portion of the 3-D object scene to zoom in to and/or increase the size of that certain portion of the 3-D object scene represented in the reconstructed holographic images 106 to enable the user to see more details regarding that certain portion of the 3-D object scene. In response to the HPC 112 determining that the user has focused attention on a certain portion of the 3-D object scene represented in the reconstructed holographic images 106 is less attentive to the 3-D object scene represented in the reconstructed holographic images 106 (e.g., is watching the reconstructed holographic images 106 of the 3-D object scene in a more casual or relaxed manner), for example, based at least in part on the user's brain wave signals, the HPC 112 can decrease the zoom level for that certain portion of the 3-D object scene to zoom out from and/or decrease the size of that certain portion of the 3-D object scene represented in the reconstructed holographic images 106 which can result in the user seeing less detail regarding that certain portion of the 3-D object scene.

The HPC 112 also can control the generation or adjustment of a reconstructed holographic image 106 to adjust (e.g., increase, decrease) the depth range (e.g., the distance between the nearest and farthest locations from the viewpoint) of the 3-D object scene represented in the reconstructed holographic image 106 (e.g., by adjusting or setting one or more depth range parameters of the optical setting) based at least in part on the detected brain wave signals in different frequency bands of the user. For example, in response to the HPC 112 determining that the user has focused attention on the 3-D object scene represented in the reconstructed holographic images 106 (e.g., based at least in part on the user's brain wave signals), the HPC 112 can increase or expand the depth range (e.g., dynamic depth range) of the reconstructed 3-D object scene represented in the reconstructed holographic images 106. In response to the HPC 112 determining that the user is less attentive to the 3-D object scene represented in the reconstructed holographic images 106 (e.g., is watching the reconstructed holographic images 106 of the 3-D object scene in a more casual or relaxed manner), for example, based at least in part on the user's brain wave signals, the HPC 112 can decrease or make narrower the depth range of the reconstructed 3-D object scene represented in the reconstructed holographic images 106.

With further regard to the display component 108, the display component 108 can be electronically accessible. The HGC 110 can be associated with (e.g., communicatively connected to) the the display component 108 and can provide (e.g., communicate) the 3-D hologram (e.g., the 3-D complex or phase hologram) to the display component 108, for example, at video rate or a faster rate in real or near real time. In some implementations, the 3-D hologram can be on recorded media (e.g., 2-D media, such as film), and the HGC 110 can provide the 3-D hologram via the recorded media, as disclosed herein.

The display component 108 can facilitate generating, reconstructing, reproducing, or presenting 3-D holographic images 106 (e.g., full-parallax 3-D Fresnel holographic images) that can represent or recreate the original 3-D object scene, based at least in part on the hologram, and can present (e.g., display) the 3-D holographic images 106 for viewing by one or more viewers from various visual perspectives of the original 3-D object scene. In some implementations, the HGC 110 and the display component 108 can operate in conjunction with each other to facilitate generating, reconstructing, reproducing, or presenting the 3-D holographic images 106 that can represent or recreate the original 3-D object scene, based at least in part on the hologram, for presentation, by the display component 108. The display component 104 can be or can comprise a display device(s), such as an SLM display device, an LCoS display device, or other high-resolution display device that can be used to facilitate displaying 3-D holographic images 106 (e.g., full-parallax 3-D holographic images) that can be reconstructed using the hologram. In some implementations, the display component 108 can be or can comprise a phase-only or phase-specific display device(s) (e.g., phase-only SLM display device).

In accordance with various implementations, the display component 108 can include one or more display units (e.g., one or more electronically accessible display units, wherein each pixel of a display unit(s) can be electronically accessible). A display unit can be a phase-only display device, such as a phase-only SLM display device or a phase-only LCoS display device, or can be configured to display complex holographic images. In some implementations, the display component 108 can comprise one or more of high-resolution LCDs, autostereoscopic display devices (e.g., multiple-section autostereoscopic displays (MSADs)), holographic 3-D television (TV) displays, high-resolution LCoS display devices, high-resolution SLM display devices, or other desired display devices suitable for displaying holographic images 106 (e.g., 3-D Fresnel holographic images produced from phase holograms), to facilitate displaying (e.g., real time displaying) of holographic images.

Additionally and/or alternatively, if desired, a hologram can be produced (e.g., by the HGC 110 or another component) onto a desired material (e.g., onto film using photographic techniques) so that there can be a hard copy of the hologram that can be used to reproduce the 3-D holographic images 106 at a desired time. In some implementations, the HGC 110 can generate the digital hologram (e.g., the 3-D phase hologram) using a single static media, such as a photographic film or a printout, comprising information relating to the digital hologram. The display component 108 can display holographic images 106 that can be reconstructed based at least in part on the digital hologram of the static media.

It is to be appreciated and understood that the holographic output (e.g., 3-D hologram and/or corresponding 3-D holographic images) can be communicated over wired or wireless communication channels to the display component 108 or other display components (e.g., remote display components, such as a 3-D TV display) to facilitate generation (e.g., reconstruction, reproduction) and display of the 3-D holographic images 106 of the 3-D object scene) so that the 3-D holographic images 106 can be presented to desired observers.

The system 100 and/or other systems, methods, devices, processes, techniques, etc., of the disclosed subject matter can be employed in any of a number of different applications. Such applications can include, for example, a 3-D holographic video display system or device, desktop ornaments, attractions in theme parks, live stage or concerts, toys, other entertainment-related or personal applications or purposes, medical or research equipment, educational applications or purposes, a holographic studio, scientific research, other professional applications or purposes, or in another desired product or for another desired use.

Figure 2:
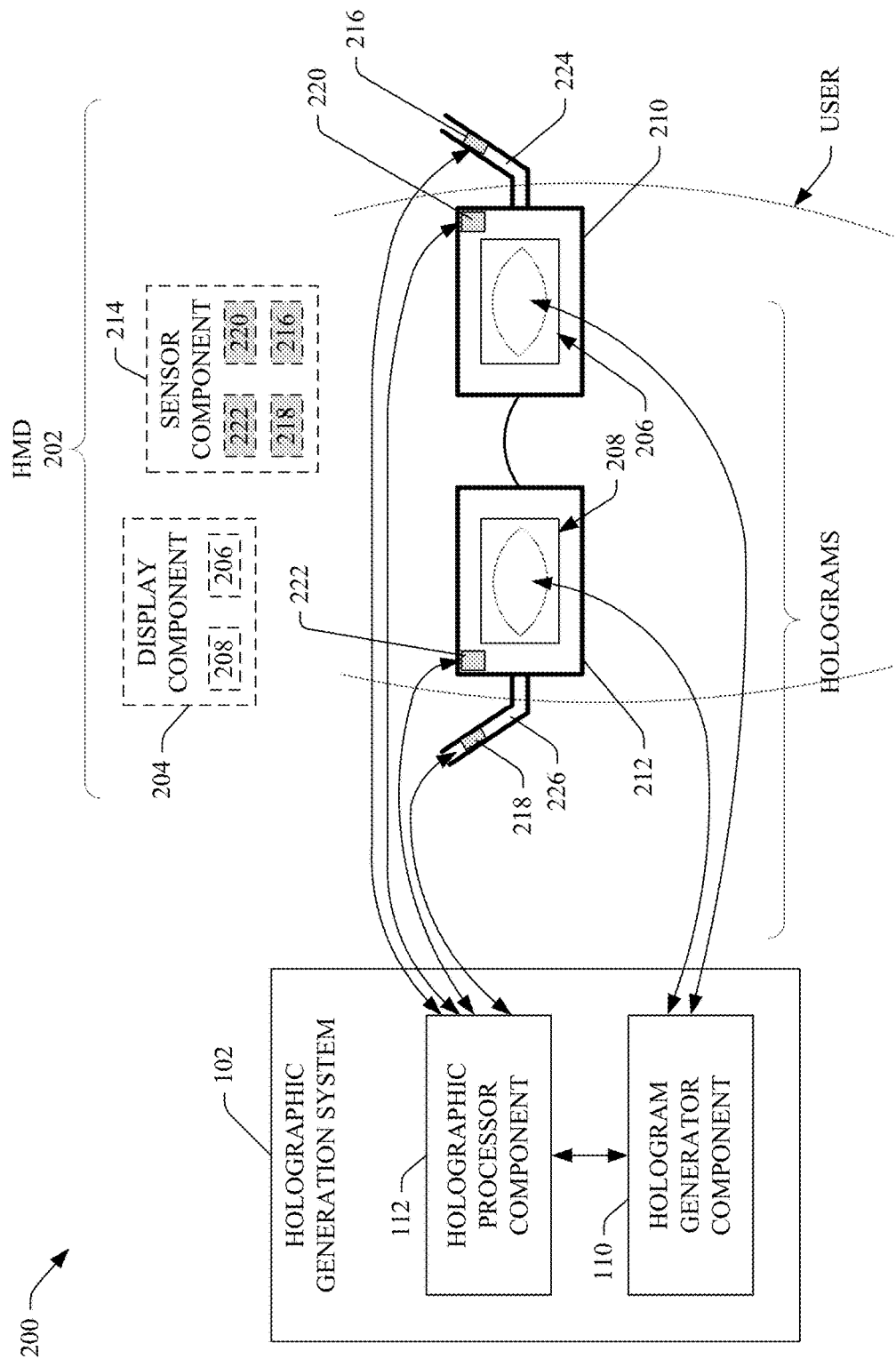
FIG. 2 depicts a diagram of an example system can control visual attributes of visual images presented on a display(s) of a head mount display based at least in part on the brain wave signals of a user(s), in accordance with various aspects and embodiments of the disclosed subject matter.

FIG. 2 depicts a diagram of an example system 200 that can control (e.g., adaptively control) visual attributes of visual images (e.g., 3-D holographic images) presented on a display(s) of an HMD based at least in part on the brain wave signals of a user(s), in accordance with various aspects and embodiments of the disclosed subject matter. In some implementations, the example system 200 can comprise the holographic generation system 102, which can comprise the HGC 110 and HPC 112.

The system 200 also can comprise an HMD 202 that can be worn on the head of a user. In some implementations, the HMD 202 can be electronic glasses that can have computing, communication, and/or visual display functionality. The HMD 202 can comprise a display component 204 that can comprise a set of display sub-components, such as display sub-component 206 and display sub-component 208, wherein the display sub-component 206 can be in proximity to the user's left eye when the user is wearing the HMD 202, and the display sub-component 208 can be in proximity to the user's right eye when the user is wearing the HMD 202. The display sub-component 206 and display sub-component 208 can be associated with (e.g., in proximity to, integrated with, connected to) the left lens 210 and right lens 212, respectively, of the HMD 202, wherein the right/left perspective is from the user's viewpoint while wearing the HMD 202.

The HMD 202 also can comprise a sensor component 214 that can comprise a set of sensor sub-components (e.g., sensors), including, for example, sensor sub-component 216, sensor sub-component 218, sensor sub-component 220, and sensor sub-component 222, that can be employed to monitor, track, sense, and/or capture brain wave signals in different bands of the user and/or physical signals of the user in response to the user viewing holographic images that can represent an object scene and/or other stimuli experienced by the user. In some implementations, the sensor sub-component 216 can be associated with (e.g., part of, integrated with, connected to, in proximity to) a left arm 224 of the HMD 202, wherein the left arm 224 can be associated with (e.g., connected to) the left lens 210. The sensor sub-component 218 can be associated with (e.g., part of, integrated with, connected to, in proximity to) a right arm 226 of the HMD 202, wherein the right arm 226 can be associated with (e.g., connected to) the right lens 212. The sensor sub-components 216 and 218 can, for example, monitor and detect brain wave signals in different frequency bands of the user as the user views holographic images representing an object scene and generated from holograms (e.g., processed, modified, or enhanced holograms). The sensor sub-components 216 and 218 also can monitor and detect physical signals or responses of the user as the user views the holographic images.

In certain implementations, the sensor sub-component 220 can be associated with (e.g., part of, integrated with, connected to, in proximity to) the left lens 210 of the HMD 202, and the sensor sub-component 222 can be associated with (e.g., part of, integrated with, connected to, in proximity to) the right lens 212 of the HMD 202. The sensor sub-components 220 and 222 can monitor and detect physical signals or responses (e.g., eye responses, facial expressions) of the user as the user views the holographic images. In some implementations, the sensor sub-components 220 and 222 also can monitor and detect brain wave signals in different frequency bands of the user as the user views the holographic images.

The sensor component 214, including, for example, sensor sub-component 216, sensor sub-component 218, sensor sub-component 220, and sensor sub-component 222, can communicate information relating to the brain wave signals and/or physical signals of the user to the HPC 112 for analysis by the HPC 112, as more fully disclosed herein. The HPC 112 can determine one or more adjustments or settings for one or more parameters of the optical setting for the holograms based at least in part on the results of the analysis of the information relating to the brain wave signals and/or physical signals of the user in response to viewing the holographic images. The HGC 110 and/or HPC 112 can modify the holograms based at least in part on the one or more adjustments or settings for the one or more parameters of the optical setting to generate modified holograms that can represent the object scene, but which have been modified to reflect the mental, emotional, and/or physical state of the user, as determined by the HPC 112 based at least in part on the information relating to the brain wave signals and/or physical signals of the user.

In some implementations, the HGC 110 can communicate information (e.g., holographic data) relating to the modified holograms to the display component 204 via a wireline or wireless communication connection using a desired communication technology. The display component 204 can facilitate generating reconstructed holographic images based at least in part on the modified holograms being illuminated by a coherent light beam. The reconstructed holographic images (e.g., modified reconstructed holographic images) can be presented (e.g., displayed) to the user on the display sub-component 206 and display sub-component 208.

It is to be appreciated and understood that, while the holographic generation system 102 is depicted as being separate from the HMD 202, the disclosed subject matter is not so limited. In accordance with various implementations, all or part of the holographic generation system 102 can be part of (e.g., integrated with) the HMD 202. For example, the HGC 110 and/or HPC 112 can be part of the HMD 202.

Figure 3:
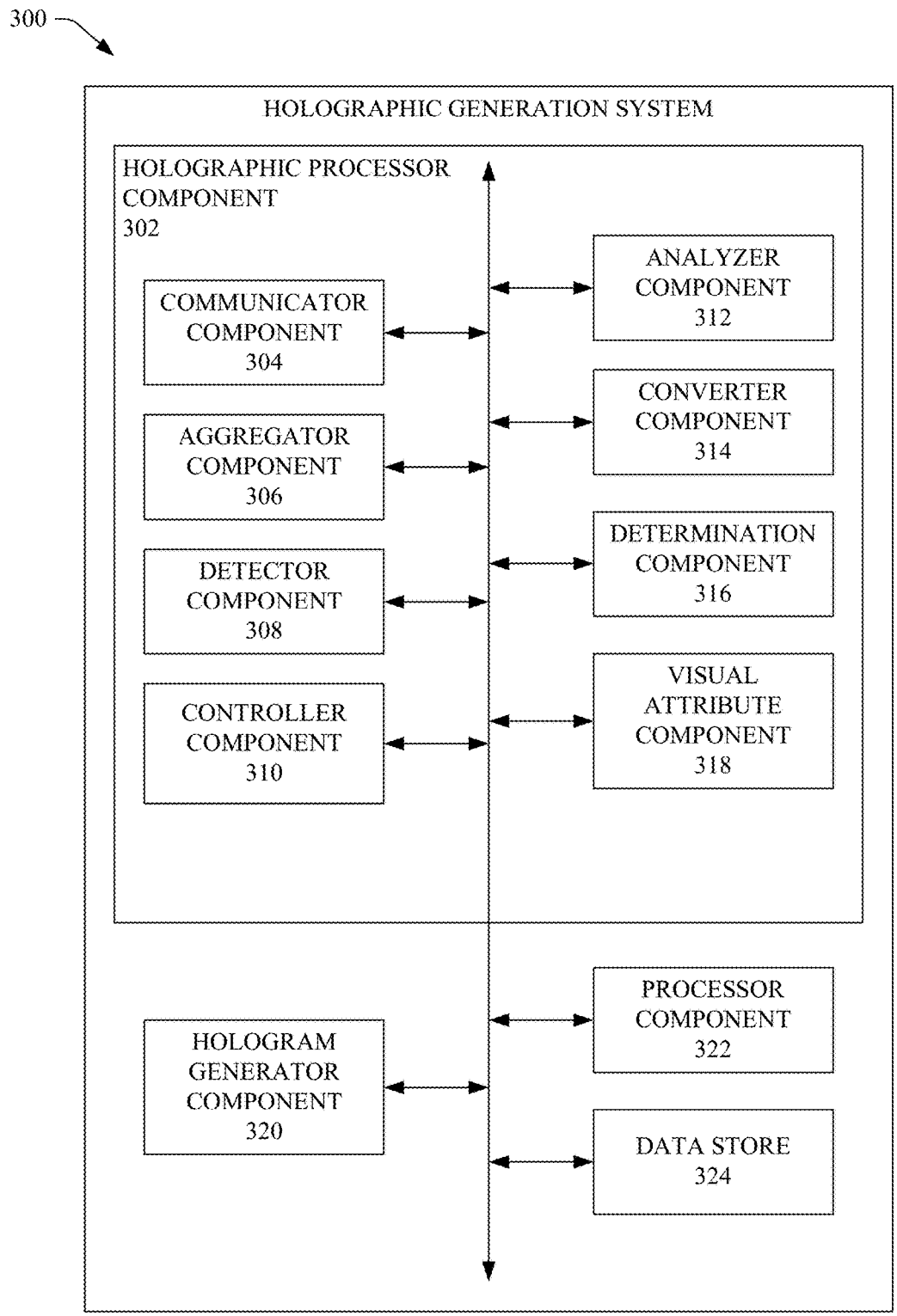
FIG. 3 illustrates a block diagram of an example holographic generation system that can control visual attributes of visual images based at least in part on the brain wave signals of a user(s), in accordance with various aspects and embodiments of the disclosed subject matter.

FIG. 3 illustrates a block diagram of an example holographic generation system 300 that can control (e.g., adaptively control) visual attributes (e.g., visual characteristics, visual effects) of visual images (e.g., 3-D holographic images) based at least in part on the brain wave signals of a user(s), in accordance with various aspects and embodiments of the disclosed subject matter. The holographic generation system 300 can comprise an HPC 302 that can control generation and presentation of holograms (e.g., reconstructed holographic images from holograms). The HPC 302 can determine one or more adjustments that can be made to one or more parameters of an optical setting associated with holograms based at least in part on the respective strengths of brain waves at the different frequency bands detected from a user (e.g., hologram observer) to facilitate enhancing and/or customizing the holograms being presented to the user to facilitate enhancing the viewing pleasure of the user with respect to the holograms, as more fully disclosed herein. The HPC 302 can comprise, for example, a communicator component 304, an aggregator component 306, a detector component 308, a controller component 310, an analyzer component 312, a converter component 314, a determination component 316, and a visual attribute component 318.

The communicator component 304 can be used to communicate (e.g., transmit, receive) information between the holographic generation system 300 and other components (e.g., sensor component(s), display component(s), processor component(s), user interface(s), visual interface(s), data store(s), etc.). The information can include, for example, information relating to brain wave signals of a user in response to viewing the holograms, information relating to physical signals of a user in response viewing the holograms, information relating the user's response to other stimuli while experiencing the holograms, video or audio signals, user command or selection information, optical parameter or optical setting information, visual attribute or effect related information, etc.

The aggregator component 306 can aggregate data received (e.g., obtained) from various entities (e.g., sensor component(s), display component(s), processor component(s), user interface(s), visual interface(s), data store(s), etc.). The aggregator component 306 can correlate respective items of data based at least in part on type of data, source of the data, time or date the data was generated or received, hologram with which data is associated, visual attribute, parameter, or optical setting with which data is associated, user with which data is associated, etc., to facilitate processing of the data (e.g., analyzing and other processing of the data by the controller component 310, the analyzer component 312, . . . , the visual attribute component 318).

The detector component 308 can monitor and/or detect information relating to brain wave signals or physical signals sensed by the sensor component in response to the user viewing the holograms or experiencing other stimuli. For example, as the user is viewing the holograms, the detector component 308 can monitor, detect, and/or receive information relating to brain wave signals in different frequency bands of the user that are output by the sensor component associated with the user.

The controller component 310 can control operations relating to processing information relating to the holograms, the visual attributes (e.g., visual characteristics, visual effects), and/or the user to facilitate generation of processed (e.g., enhanced, modified) holograms by the HPC 302 that can be presented to the user to facilitate enhancing the viewing pleasure of the user as the user views the holograms. The controller component 310 can facilitate controlling operations being performed by various components of the HPC 302, controlling data flow between various components of the HPC 302, controlling data flow between the HPC 302 and other components of the holographic generation system 300, etc.

The analyzer component 312 can analyze data (e.g., brain wave signals of a user received from the sensor component(s)) to facilitate converting or translating information relating to brain wave signals or physical signals of a user into information representative of the brain waves, emotion, reaction, physical expression, etc., of the user in response to viewing the holograms or experiencing other stimuli in connection with the viewing of the holograms. The analyzer component 312 also can analyze data to facilitate determining optical parameters (e.g., visual parameters) that can be applied to an optical setting and/or an visual effect(s) that can be applied to the holograms to process (e.g., enhance, modify) the holograms, and/or performing another process(es) on information relating to the holograms or the user, to facilitate enhancing the viewing pleasure of the user as the user views the holograms, based at least in part on the brain wave signals of the user. The analyzer component 312 can generate analyses results based at least in part on such data analyses, wherein the data analyses can be used by another component(s) (e.g., the controller component 310, the converter component 314, . . . , the visual attribute component 318) to facilitate performance of various operations of the HPC 302.

The converter component 314 can convert or translate information, which can relate to brain wave signals or physical signals of the user in response to perceiving (e.g., viewing) the holograms or in response to other stimuli while perceiving holograms, into data (e.g., data signals) that can be representative of or indicative of the brain wave signals or physical signals of the user and/or can be representative of or indicative of the mental state, emotion, and/or expression of the user in response to perceiving the holograms or in response to experiencing the other stimuli. The converted data (e.g., data signals) can be in a form (e.g., a data format) that can be usable by the HPC 302 to facilitate determining a response (e.g., a mental state, expression, reaction, or other response) of the user to viewing the holograms or experiencing the other stimuli, determining one or more parameters of an optical setting to apply to process the holograms, determining a visual effect(s) to employ or adjust in connection with processing the holograms, determining respective parameter settings to apply to respective visual attributes of the holograms in connection with processing the holograms, and/or otherwise processing the holograms.

The determination component 316 can perform determinations, measurements, and/or calculations on data (e.g., information relating to brain wave signals, physical signals, other stimuli, holograms, etc.) to facilitate determining signal strengths of brain wave signals in different frequency bands, determining respective parameters of an optical setting that can be applied to process holograms, a visual effect(s) that can be applied to the holograms, and/or performing another process(es) on information relating to the presentation of the holograms to the user, to facilitate enhancing the viewing pleasure of the user as the user views the holograms, based at least in part on the brain wave signals in different frequency bands of the user.

The visual attribute component 318 can comprise or relate to one or more visual characteristics or effects that can be adjusted or set as part of the optical setting to facilitate enhancing the holograms for presentation to the user. The one or more visual characteristics or effects can comprise, for example, a 3-D effect (e.g., a 3-D holographic or spatial effect), a zoom effect or characteristic (e.g., relating to a zooming level for all or one or more localized regions of the hologram), a filtering effect, a hologram focus characteristic (e.g., relating to focus level), a focal-distance characteristic, an overall-distance characteristic (e.g., relating to the overall distance between the object space and the hologram), a depth range characteristic or effect, a hologram size characteristic, a visual quality characteristic, a visual brightness characteristic, a visual contrast characteristic, a parallax (e.g., horizontal and/or vertical parallax) characteristic, with respect to the holograms. The HPC 302 can control (e.g., set, adjust) the one or more visual characteristics or effects associated with the visual attribute component 318 can comprise or relate to facilitate enhancing the holograms to facilitate enhancing the viewing pleasure of the user while viewing the holograms.

The holographic generation system 300 also can comprise an HGC 320 that can be associated with the HPC 302. The HGC 320 can generate holograms (e.g., enhanced, modified holograms) that can represent an object scene (e.g., a real or synthetic 3-D object scene). The HPC 302 can control operation of the HGC 320 to facilitate enabling the HGC 320 to generate holograms that can be modified based at least in part on a set of optical parameters of an optical setting(s) in response to the brain wave signals in different frequency bands of the user in connection with the user viewing the holograms, as more fully disclosed herein. The HGC 320 can employ one or more hologram generation processes to generate complex and/or phase holograms at video rate or faster in real, or at least near real time, as more fully disclosed herein.

The holographic generation system 300 also can comprise a processor component 322 that can operate in conjunction with the other components (e.g., HPC 302, HGC 320) to facilitate performing the various functions of the holographic generation system 300. The processor component 322 can employ one or more processors (e.g., central processing units (CPUs), GPUs, FPGAs), microprocessors, or controllers that can process data, such as information relating to brain waves of a user, physical actions of a user, holograms, optical settings, visual effects or characteristics, parameters or coefficients relating to optical settings, etc., to facilitate determining one or more parameters of an optical setting for a hologram, determining a video characteristic or effect to apply for a holograms, otherwise processing (e.g., enhancing) a hologram, or performing other operations relating to processing holograms; and can control data flow between the holographic generation system 300 and other components (e.g., sensor component(s), display component(s)) associated with the holographic generation system 300.

In yet another aspect, the holographic generation system 300 can contain a data store 324 that can store data structures (e.g., user data, metadata); code structure(s) (e.g., modules, objects, classes, procedures), commands, or instructions; information relating to brain waves of a user, physical actions of a user, holograms, optical settings, visual effects or characteristics, parameters or coefficients relating to optical settings, etc.; algorithms (e.g., algorithm(s) that can facilitate converting sensed information relating to brain waves of a user to information indicative of the response or mental state of the user in response to viewing holograms, a hologram processing algorithm(s) or visual effect algorithm(s)); and so on. In an aspect, the processor component 322 can be functionally coupled (e.g., through a memory bus) to the data store 324 in order to store and retrieve information desired to operate and/or confer functionality, at least in part, to the HPC 302, HGC 320, etc., and/or substantially any other operational aspects of the holographic generation system 300. It is to be appreciated and understood that the various components of the holographic generation system 300 can communicate information between each other and/or between other components associated with the holographic generation system 300 as desired to carry out operations of the holographic generation system 300.

It is to be further appreciated and understood that respective components (e.g., HPC 302, HGC 320) of the holographic generation system 300 each can be a stand-alone unit, can be included within the holographic generation system 300 (as depicted), can be incorporated within another component of the holographic generation system 300 or a component separate from the holographic generation system 300, and/or virtually any suitable combination thereof, as desired. It also is to be appreciated and understood that one or more components (e.g., communicator component 304, aggregator component 306, detector component 308, . . . ) of the HPC 302 can be shared with or employed by the HGC 320, processor component 322, data store 324, or another component(s) of the holographic generation system 300.

Figure 4:
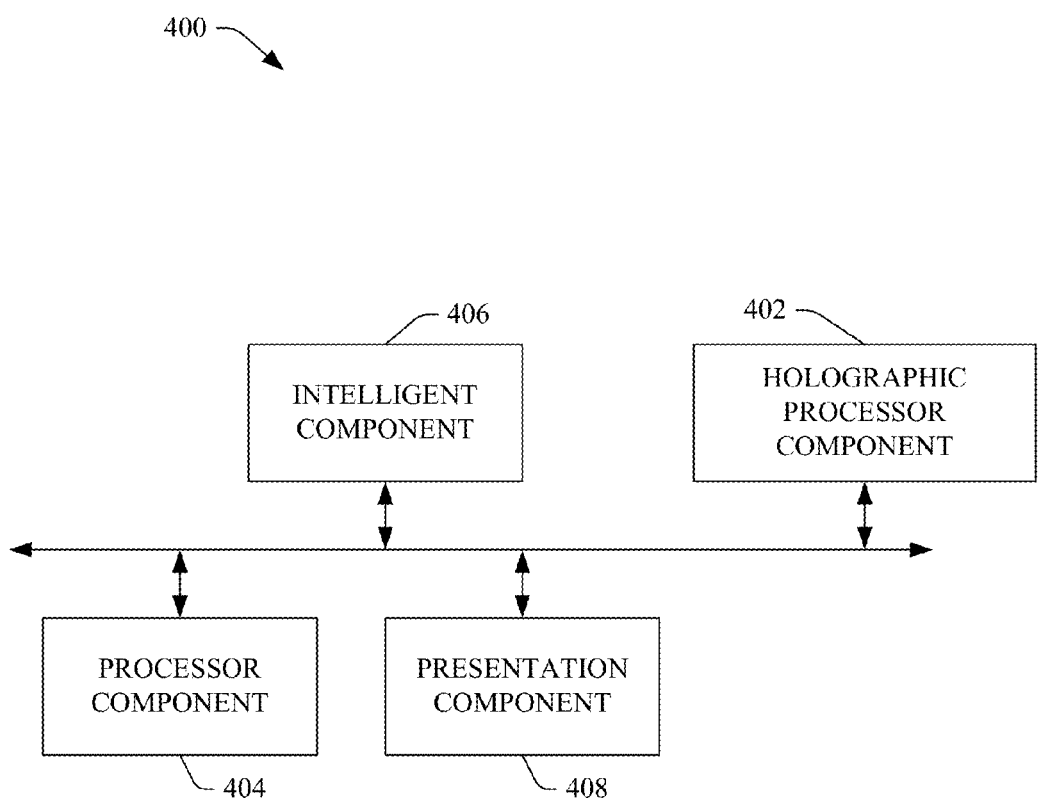
FIG. 4 depicts a system that can employ intelligence to facilitate controlling visual attributes of visual images based at least in part on the brain wave signals of a user(s), in accordance with various aspects and embodiments of the disclosed subject matter.

Referring to FIG. 4, depicted is a block diagram of a system 400 that can employ intelligence to facilitate controlling (e.g., adaptively controlling) visual attributes of visual images (e.g., 3-D holographic images) based at least in part on the brain wave signals of a user(s), in accordance with various aspects and embodiments of the disclosed subject matter. The system 400 can include an HPC 402 that can desirably control generation, modification, and presentation of holograms (e.g., reconstructed holographic images from holograms). The HPC 302 can determine one or more adjustments that can be made to one or more parameters of an optical setting associated with holograms based at least in part on the respective strengths of brain waves at the different frequency bands detected from a user (e.g., hologram observer) to facilitate enhancing and/or customizing the holograms being presented to the user to facilitate enhancing the viewing pleasure of the user with respect to the holograms, as more fully disclosed herein. The HPC 402 can be associated with (e.g., communicatively connected to) a sensor component (not shown in FIG. 4) that can be associated with a user to facilitate sensing brain wave signals of the user, for example, in response to perceiving (e.g. viewing) holograms provided a holographic generation system and display component, as more fully described herein.

The system 400 can further include a processor component 404 that can be associated with (e.g., communicatively connected to) the HPC 402 and/or other components (e.g., components of system 400) via a bus. In accordance with an embodiment of the disclosed subject matter, the processor component 404 can be an applications processor(s) that can manage communications and run applications. For example, the processor component 404 can be a processor that can be utilized by a computer, mobile computing device, personal data assistant (PDA), or other electronic computing device. The processor component 404 can generate, communicate, and/or execute commands in order to facilitate analyzing information relating to brain wave signals or physical signals (e.g., facial expressions, eye response, hand or finger gestures, etc.) of a user (e.g., observer), detecting respective strengths of brain wave signals of a user, determining one or more parameters of an optical setting to facilitate desirably (e.g., suitably) processing the holograms, processing the holograms to generate the processed holograms, etc.

The system 400 also can include an intelligent component 406 that can be associated with (e.g., communicatively connected to) the HPC 402, the processor component 404, and/or other components associated with system 400 to facilitate analyzing data, such as current and/or historical information, and, based at least in part on such information, can make an inference(s) and/or a determination(s) regarding, for example, respective strengths of brain wave signals of the user, which parameter settings or adjustments to make to an optical setting to modify or enhance a hologram, which visual attributes to apply or adjust to facilitate desirably processing the holograms, how the holograms are to be processed to generate the processed holograms, etc.

For example, based in part on current and/or historical evidence, the intelligent component 406 can infer or determine a signal strength of a brain wave signal of the user in a particular frequency band, which parameter settings or adjustments to make to an optical setting to modify or enhance a hologram, which visual attributes to apply or adjust to facilitate desirably processing the holograms, a process(es) to apply to the holograms to facilitate generating the processed holograms, etc.

In an aspect, the intelligent component 406 can communicate information related to the inferences and/or determinations to the HPC 402. Based at least in part on the inference(s) or determination(s) made by the intelligent component 406, the HPC 402 can take (e.g., automatically or dynamically take) one or more actions to facilitate desirably processing the holograms to generate processed (e.g., modified, enhanced) holograms that can enhance the viewing pleasure of the user as the user views to the holograms. For instance, the HPC 402 can determine or identify a signal strength of a brain wave signal of the user for a particular frequency band, a parameter setting or adjustment to make to an optical setting to modify or enhance a hologram, a visual attribute to apply or adjust to facilitate desirably processing a hologram, a process(es) to apply to a hologram to facilitate generating a processed hologram, as disclosed herein.

It is to be understood that the intelligent component 406 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data (e.g., historical data), whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the disclosed subject matter.

A classifier is a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

System 400 also can include a presentation component 408, which can be connected with the processor component 404. The presentation component 408 can provide various types of user interfaces to facilitate interaction between a user and any component coupled to the processor component 404. As depicted, the presentation component 408 is a separate entity that can be utilized with the processor component 404 and associated components. However, it is to be appreciated that the presentation component 408 and/or similar view components can be incorporated into the processor component 404 and/or can be a stand-alone unit. The presentation component 408 can provide one or more graphical user interfaces (GUIs) (e.g., touchscreen GUI), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed. For example, the user can interact with one or more of the components coupled to and/or incorporated into the processor component 404.

The user can also interact with the regions to select and provide information via various devices such as a mouse, a roller ball, a keypad, a keyboard, a touchscreen, a pen and/or voice activation, for example. Typically, a mechanism such as a push button or the enter key on the keyboard can be employed subsequent entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can than provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

In accordance with one embodiment of the disclosed subject matter, HPC 402 and/or other components, can be situated or implemented on a single integrated-circuit chip. In accordance with another embodiment, the HPC 402, and/or other components, can be implemented on an application-specific integrated-circuit (ASIC) chip. In yet another embodiment, the HPC 402 and/or other components, can be situated or implemented on multiple dies or chips.

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

Figure 5:
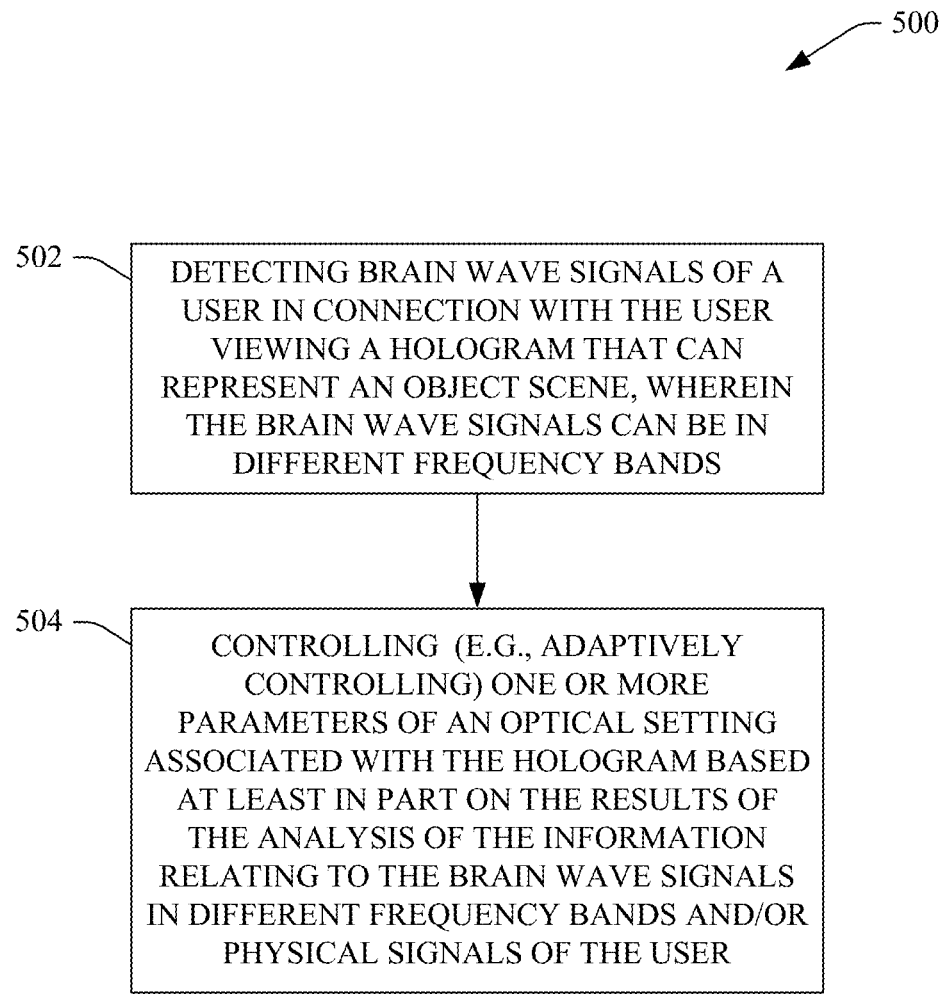
FIG. 5 illustrates a flow diagram of an example method that can control parameters of an optical setting associated with a hologram presented to a user based at least in part on the brain wave signals of a user(s), in accordance with various aspects and embodiments of the disclosed subject matter.
Figure 6:
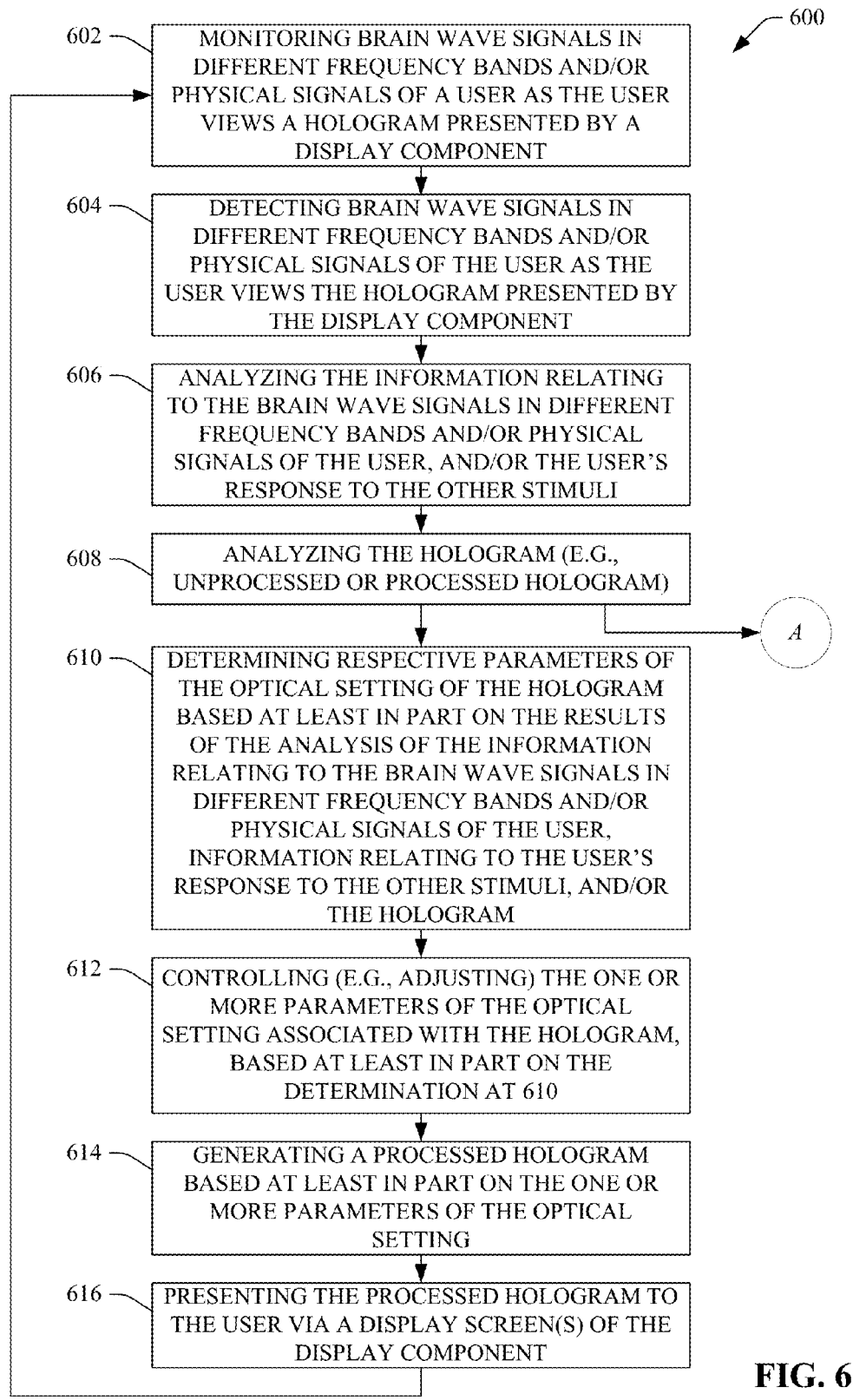
FIG. 6 depicts a flow diagram of another example method that can control parameters of an optical setting associated with a hologram presented to a user based at least in part on the brain wave signals of a user(s), in accordance with various aspects and embodiments of the disclosed subject matter.
Figure 7:
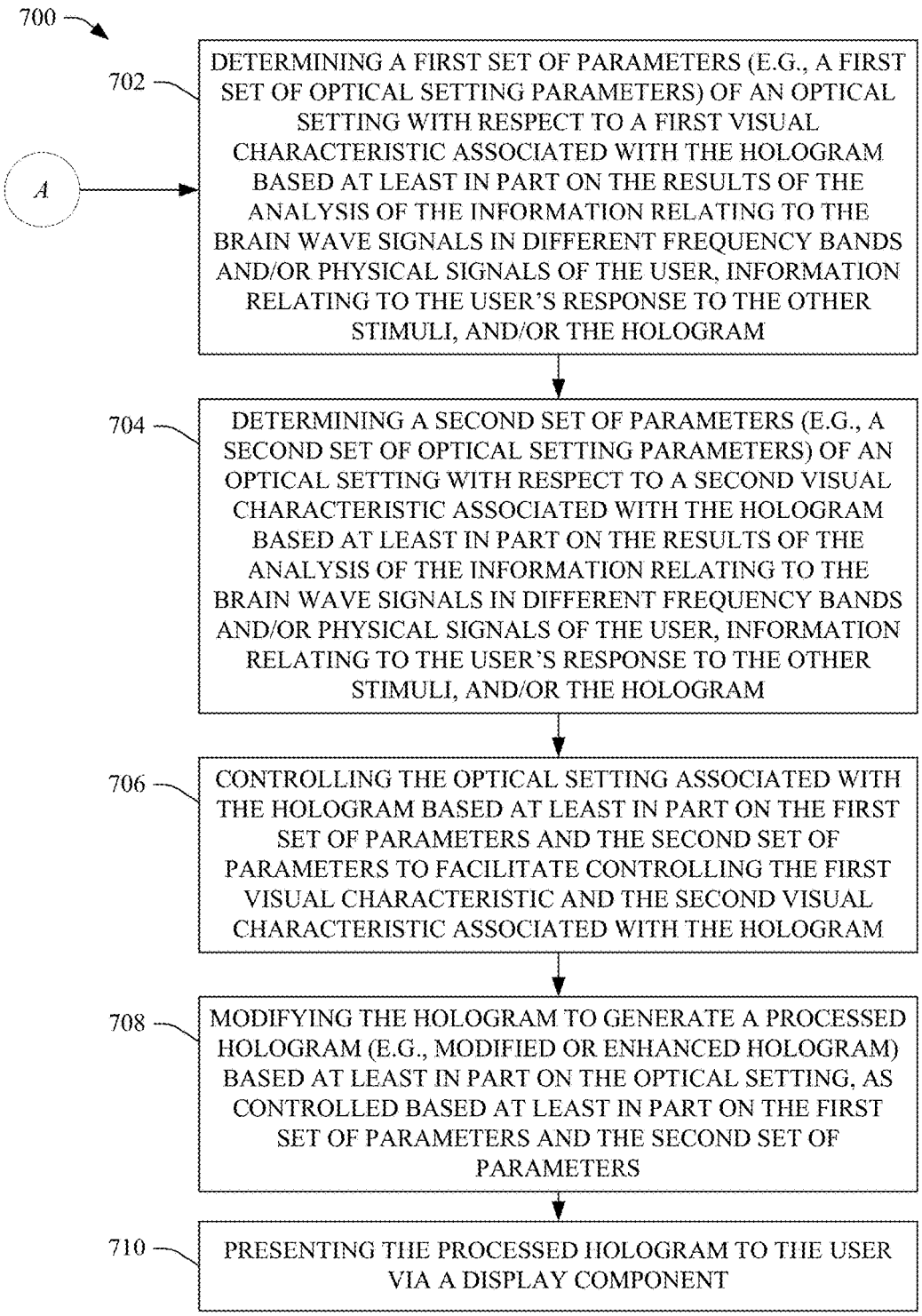
FIG. 7 presents a flow diagram of an example method that can control parameters of an optical setting associated with a hologram presented to a user for respective visual characteristics based at least in part on the brain wave signals of a user(s) in different frequency bands, in accordance with various aspects and embodiments of the disclosed subject matter.

FIGS. 5-7 illustrate methods and/or flow diagrams in accordance with the disclosed subject matter. For simplicity of explanation, the methods are depicted and described as a series of acts. It is to be understood and appreciated that the subject disclosure is not limited by the acts illustrated and/or by the order of acts, for example acts can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be further appreciated that the methods disclosed hereinafter and throughout this specification are capable of being stored on an article of manufacture to facilitate transporting and transferring such methods to computers. The term article of manufacture, as used herein, is intended to encompass a computer program accessible from any computer-readable device, carrier, or media.

Referring to FIG. 5, illustrated is a flow diagram of an example method 500 that can control (e.g., adaptively control) parameters of an optical setting associated with a hologram presented to a user based at least in part on the brain wave signals of a user(s), in accordance with various aspects and embodiments of the disclosed subject matter. The method 500 can be implemented by a holographic generation system, comprising an HPC and HGC, that can be associated a sensor component and a display component, as more fully described herein.

At 502, brain wave signals of a user can be detected in connection with the user viewing a hologram that can represent an object scene, wherein the brain wave signals can be in different frequency bands. As the user is viewing the holograms presented by the display component, the sensor component can sense or detect brain wave signals, which can represent brain activity or responses of the brain of the user, and/or physical signals of the user, in response to the user viewing the hologram. The HPC can receive (e.g., in real or near real time) information relating to the brain wave signals in different frequency bands and/or physical signals of the user from the sensor component. The HPC can detect or determine (e.g., in real or near real time) the brain wave signals (e.g., detect or determine alpha wave values and/or beta wave values of the brain wave signals) based at least in part on analysis results obtained from an analysis of the information relating to the brain wave signals from different frequency bands by the HPC.

At 504, one or more parameters of an optical setting associated with the hologram can be controlled (e.g., adaptively controlled, in real or near real time) based at least in part on the results of the analysis of the information relating to the brain wave signals in different frequency bands and/or physical signals of the user. The HPC can analyze the information relating to the brain wave signals in different frequency bands and/or physical signals of the user. Based at least in part on the analysis, the HPC can determine (e.g., automatically or dynamically determine, in real or near real time) one or more parameters to apply for the optical setting for the hologram to facilitate desirably processing (e.g., modifying, enhancing) the hologram to generate a processed (e.g., modified, enhanced) hologram for presentation to the user by the display component to facilitate enhancing the viewing pleasure or experience of the user as the user views to the hologram (e.g., the holographic images of the hologram). The HPC can (e.g., automatically or dynamically, in real or near real time) apply the one or more parameters (e.g., parameter values or settings) to the optical setting associated with the hologram to facilitate processing the hologram to generate the processed hologram for presentation to the user by the display component. The HPC can continue to monitor the feedback from the user (e.g., brain wave signals or physical signals of the user) in response to viewing the hologram (e.g., processed hologram) or other stimuli experienced by the user as the user views the hologram, and can continue to control the one or more parameters of the optical setting associated with the hologram based at least in part on the results of an analysis of the feedback obtained from the user.

Turning to FIG. 6, depicted is a flow diagram of another example method 600 that can control (e.g., adaptively control) parameters of an optical setting associated with a hologram presented to a user based at least in part on the brain wave signals of a user(s), in accordance with various aspects and embodiments of the disclosed subject matter. The method 600 can be implemented by a holographic generation system, comprising an HPC and HGC, that can be associated a sensor component and a display component, as more fully described herein.

At 602, brain wave signals in different frequency bands and/or physical signals of a user can be monitored as the user views a hologram presented by the display component. At 604, brain wave signals in different frequency bands and/or physical signals of the user can be detected (e.g., in real or near real time) as the user views the hologram presented by the display component. The sensor component can sense or detect brain wave signals, which can represent the brain activity or response of the user, in different frequency bands and/or physical signals of the user, in response to the user viewing the hologram, and/or can sense or detect the user's response to other stimuli as the user is viewing the hologram. The HPC can monitor the brain wave signals in different frequency bands and/or physical signals of a user as the user views the hologram presented by the display component, and can detect or receive (e.g., in real or near real time) information relating to the brain wave signals in different frequency bands and/or physical signals of the user, and/or the user's response to the other stimuli, from the sensor component.

At 606, the information relating to the brain wave signals in different frequency bands and/or physical signals of the user, and/or the user's response to the other stimuli, can be analyzed. The HPC can analyze the information relating to the brain wave signals in different frequency bands and/or physical signals of the user, and/or the user's response to the other stimuli, and generate analysis results that can facilitate controlling one or more parameters of an optical setting associated with the hologram to facilitate enhancing the user's viewing experience with respect to the hologram.

At 608, the hologram (e.g., unprocessed or previously processed hologram) can be analyzed. In connection with the analysis the information relating to the brain wave signals and/or physical signals of the user, and/or the user's response to the other stimuli, the HPC also can analyze the hologram to facilitate generating the analysis results that can be used to facilitate controlling the one or more parameters for the optical setting of the hologram to facilitate enhancing the user's hologram viewing experience. In some implementations, the method 600 can proceed to reference point A, wherein another method, such as method 700 associated with FIG. 7, can proceed from reference point A.

At 610, respective parameters (e.g., optical parameters) of the optical setting of the hologram can be determined based at least in part on the results of the analysis of the information relating to the brain wave signals in different frequency bands and/or physical signals of the user, information relating to the user's response to the other stimuli, and/or the hologram. The HPC can determine the respective parameters of the optical setting for the hologram based at least on part on such analyses results. For example, the HPC can translate respective strengths of the brain wave signals in respective frequency bands into parameter settings for the parameters of the optical setting associated with the holograms.

At 612, the one or more parameters of the optical setting associated with the hologram can be controlled (e.g., adjusted, modified), based at least in part on the determination made during the operation performed at reference numeral 610, to facilitate enhancing the hologram viewing pleasure of the user in accordance with the brain wave signals of the user. The HPC can control (e.g., set, adjust, modify, etc.) the one or more parameters of the optical setting associated with the hologram based at least in part on the determination of the one or more parameters of the optical setting from the analyses results. For instance, the HPC can facilitate setting, adjusting, modifying, or controlling the respective parameters of the optical setting for the hologram to facilitate processing (e.g., modifying, enhancing) the hologram.

At 614, a processed hologram can be generated based at least in part on the one or more parameters of the optical setting. The HPC can facilitate processing the hologram via the controlled application of the one or more parameters of the optical setting to the hologram to generate the processed hologram.

At 616, the processed hologram can be presented (e.g., displayed), via a display screen(s) of the display component, to the user. The HPC can be associated with the display component, which can comprise one or more display screens. The HPC can communicate the processed hologram to the display component for presentation (e.g., display, communication, broadcast) to the user to facilitate presenting an enhanced hologram to the user to enhance the viewing pleasure of the user as the user views the hologram (e.g., enhanced hologram).

At this point, the method 600 can return to reference numeral 602, wherein the method can continue to monitor the brain wave signals in different frequency bands and/or physical signals of the user as the user views the hologram (e.g., enhanced hologram) presented by the display component, and the method 600 can continue to proceed from that point. The operations of the method 600 can continue to be performed until the hologram presentation is completed or for as long as desired.

FIG. 7 presents a flow diagram of an example method 700 that can control (e.g., adaptively control) parameters of an optical setting associated with a hologram presented to a user for respective visual characteristics based at least in part on the brain wave signals of a user(s) in different frequency bands, in accordance with various aspects and embodiments of the disclosed subject matter. The method 700 can be implemented by a holographic generation system, comprising an HPC and HGC, that can be associated a sensor component and a display component, as more fully described herein. In some implementations, the method 700 can proceed from reference point A associated with FIG. 6.

At 702, a first set of parameters (e.g., a first set of optical setting parameters) of an optical setting can be determined with respect to a first visual characteristic associated with the hologram based at least in part on the results of the analysis of the information relating to the brain wave signals in different frequency bands and/or physical signals of the user, information relating to the user's response to the other stimuli, and/or the hologram. The HPC can determine the first set of parameters of the first visual characteristic of the hologram based at least on part on such analyses results. The first visual characteristic can be one of a set of visual characteristics (e.g., a set of optical characteristics) comprising or relating to visual quality of the hologram, size of the hologram, one or more visual effects applied to the hologram, brightness of the hologram, contrast of the hologram, level of 3-D effect of the hologram, focus level and/or focal distance of the hologram (e.g., of an image(s) or object(s) in the hologram), overall distance between the object space (e.g., the object scene) and the hologram, the depth range associated with the hologram, zooming level of one or more localized regions of the hologram, parallax (e.g., horizontal and/or vertical parallax) of the hologram, and/or other visual characteristics.

At 704, a second set of parameters (e.g., a second set of optical setting parameters) of an optical setting can be determined with respect to a second visual characteristic associated with the hologram based at least in part on the results of the analysis of the information relating to the brain wave signals in different frequency bands and/or physical signals of the user, information relating to the user's response to the other stimuli, and/or the hologram. The HPC can determine the second set of parameters of the second visual characteristic of the hologram based at least on part on such analyses results. The second visual characteristic can be another visual characteristic of the set of visual characteristics.

At 706, the optical setting associated with the hologram can be controlled based at least in part on the first set of parameters and the second set of parameters to facilitate controlling the first visual characteristic and the second visual characteristic associated with the hologram. The HPC can control the optical setting associated with the hologram based at least in part on the first and second set of parameters to facilitate controlling the first and second visual characteristics associated with the hologram. For instance, the HPC can set or adjust the respective parameters of the first and second set of parameters of the optical setting to facilitate controlling the first and second visual characteristics associated with the hologram to change how the hologram is presented to the user in response to the information relating to the detected brain wave signals in the different frequency bands and/or the physical signals of the user, and/or the information relating to the detected response of the user to other stimuli.

At 708, the hologram can be modified to generate a processed hologram (e.g., modified or enhanced hologram) based at least in part on the optical setting, as controlled based at least in part on the first set of parameters and the second set of parameters. The HPC can apply (e.g., set, adjust) the first and second set of parameters of the optical setting to the hologram, and the hologram can be modified (e.g., visual characteristics, comprising the first and second visual characteristics, of the hologram can be modified) in response to the application of the first and second set of parameters of the optical setting.

At 710, the processed hologram can be presented, via a display component, to the user. The HPC and/or HGC can be associated with the display component, which can comprise one or more displays that can be employed to displayed holograms. The HPC and/or HGC can communicate the processed hologram to the display component. The HGC and/or display component can facilitate generating reconstructed holographic images (e.g., processed (e.g., modified, enhanced) reconstructed holographic images) in response to the processed hologram being illuminated with a coherent light beam. The display component can present the reconstructed holographic images to the user to enhance the viewing pleasure of the user in response to the information relating to the detected brain wave signals in the different frequency bands and/or the physical signals of the user, and/or the information relating to the detected response of the user to other stimuli.

It is to be appreciated that, while method 700 describes operations relating to controlling and/or setting respective parameters of an optical setting for first and second visual characteristics, the disclosed subject matter is not so limited, as the method 700 can be employed to determine, set, apply, and/or control respective parameter settings of an optical setting for more than two visual characteristics of the set of visual characteristics.

Figure 8:
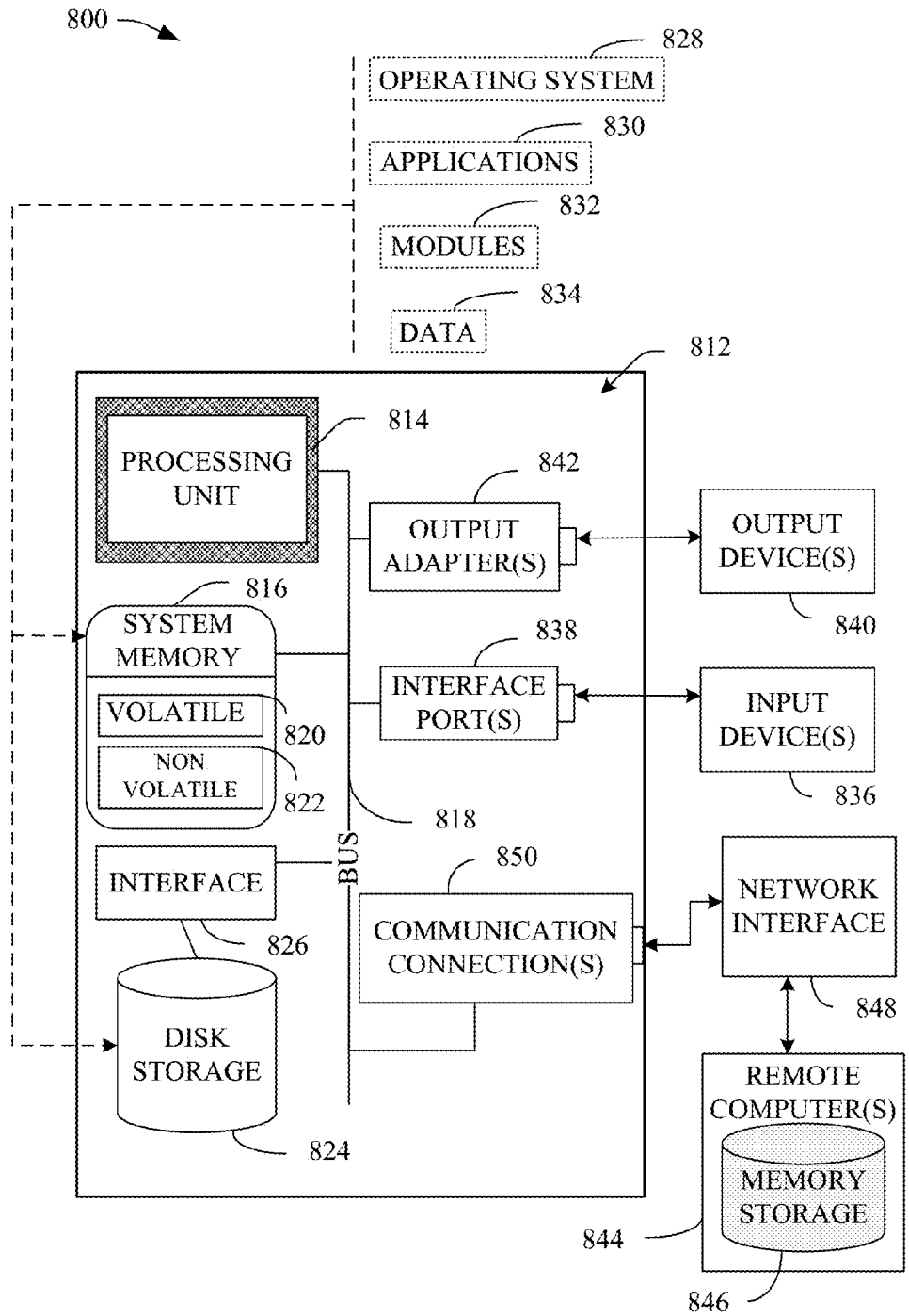
FIG. 8 is a schematic block diagram illustrating a suitable operating environment.
Figure 9:
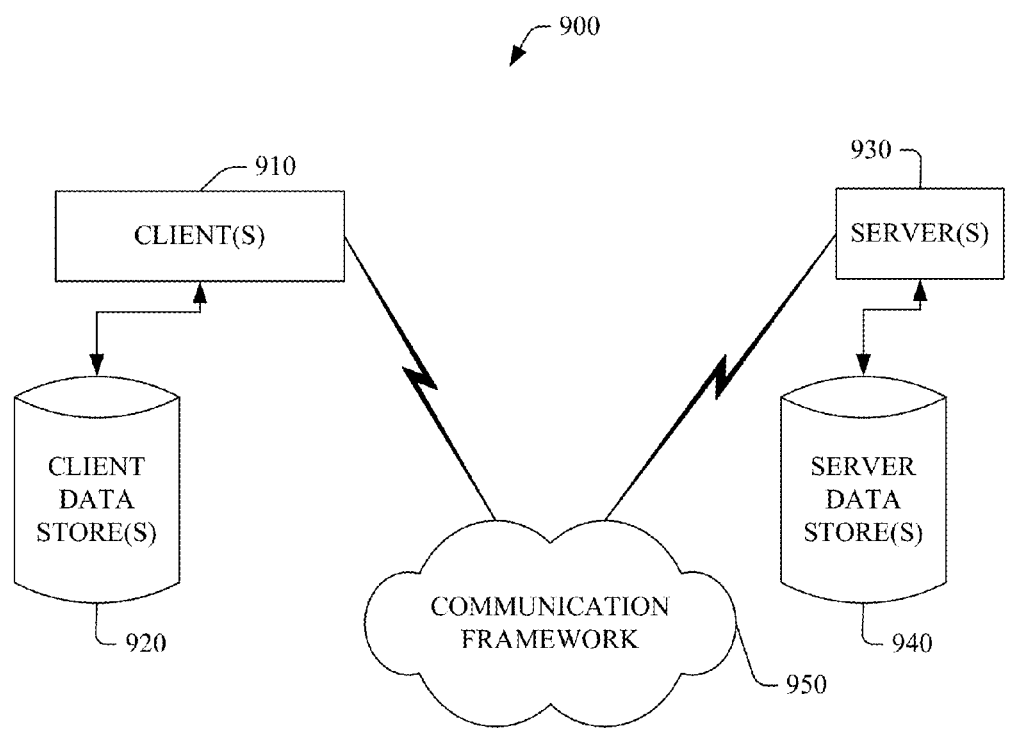
FIG. 9 is a schematic block diagram of a sample-computing environment.

In order to provide a context for the various aspects of the disclosed subject matter, FIGS. 8 and 9 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the subject disclosure also may be implemented in combination with other program modules. Generally, program modules include routines, programs, components, data structures, etc. that perform particular tasks and/or implement particular abstract data types. Moreover, those skilled in the art will appreciate that the methods may be practiced with other computer system configurations, including single-processor or multiprocessor computer systems, mini-computing devices, mainframe computers, as well as personal computers, hand-held computing devices (e.g., personal digital assistant (PDA), phone, watch), microprocessor-based or programmable consumer or industrial electronics, and the like. The illustrated aspects may also be practiced in distributed computing environments where tasks are performed by remote processing devices that are linked through a communications network. However, some, if not all aspects of the subject disclosure can be practiced on stand-alone computers. In a distributed computing environment, program modules may be located in both local and remote memory storage devices.

With reference to FIG. 8, a suitable environment 800 for implementing various aspects of the claimed subject matter includes a computer 812. The computer 812 includes a processing unit 814, a system memory 816, and a system bus 818. It is to be appreciated that the computer 812 can be used in connection with implementing one or more of the systems or components (e.g., audio processor component, audio system, sensor component, processor component, data store, etc.) shown and/or described in connection with, for example, FIGS. 1-7. The system bus 818 couples system components including, but not limited to, the system memory 816 to the processing unit 814. The processing unit 814 can be any of various available processors. Dual microprocessors and other multiprocessor architectures also can be employed as the processing unit 814.

The system bus 818 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 816 includes volatile memory 820 and nonvolatile memory 822. The basic input/output system (BIOS), containing the basic routines to transfer information between elements within the computer 812, such as during start-up, is stored in nonvolatile memory 822. By way of illustration, and not limitation, nonvolatile memory 822 can include read only memory (ROM), programmable ROM (PROM), electrically programmable ROM (EPROM), electrically erasable programmable ROM (EEPROM), or flash memory. Volatile memory 820 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 812 also can include removable/non-removable, volatile/non-volatile computer storage media. FIG. 8 illustrates, for example, a disk storage 824. Disk storage 824 includes, but is not limited to, devices like a magnetic disk drive, floppy disk drive, tape drive, Jaz drive, Zip drive, LS-100 drive, flash memory card, or memory stick. In addition, disk storage 824 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 824 to the system bus 818, a removable or non-removable interface is typically used, such as interface 826).

It is to be appreciated that FIG. 8 describes software that acts as an intermediary between users and the basic computer resources described in the suitable operating environment 800. Such software includes an operating system 828. Operating system 828, which can be stored on disk storage 824, acts to control and allocate resources of the computer system 812. System applications 830 take advantage of the management of resources by operating system 828 through program modules 832 and program data 834 stored either in system memory 816 or on disk storage 824. It is to be appreciated that the claimed subject matter can be implemented with various operating systems or combinations of operating systems.

A user enters commands or information into the computer 812 through input device(s) 836. Input devices 836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 814 through the system bus 818 via interface port(s) 838. Interface port(s) 838 include, for example, a serial port, a parallel port, a game port, and a universal serial bus (USB). Output device(s) 840 use some of the same type of ports as input device(s) 836. Thus, for example, a USB port may be used to provide input to computer 812, and to output information from computer 812 to an output device 840. Output adapter 842 is provided to illustrate that there are some output devices 840 like monitors, speakers, and printers, among other output devices 840, which require special adapters. The output adapters 842 include, by way of illustration and not limitation, video and sound cards that provide a means of connection between the output device 840 and the system bus 818. It should be noted that other devices and/or systems of devices provide both input and output capabilities such as remote computer(s) 844.

Computer 812 can operate in a networked environment using logical connections to one or more remote computers, such as remote computer(s) 844. The remote computer(s) 844 can be a personal computer, a server, a router, a network PC, a workstation, a microprocessor based appliance, a peer device or other common network node and the like, and typically includes many or all of the elements described relative to computer 812. For purposes of brevity, only a memory storage device 846 is illustrated with remote computer(s) 844. Remote computer(s) 844 is logically connected to computer 812 through a network interface 848 and then physically connected via communication connection 850. Network interface 848 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 850 refers to the hardware/software employed to connect the network interface 848 to the bus 818. While communication connection 850 is shown for illustrative clarity inside computer 812, it can also be external to computer 812. The hardware/software necessary for connection to the network interface 848 includes, for exemplary purposes only, internal and external technologies such as, modems including regular telephone grade modems, cable modems and DSL modems, ISDN adapters, and Ethernet cards.

FIG. 9 is a schematic block diagram of a sample-computing environment 900 with which the subject disclosure can interact. The system 900 includes one or more client(s)

910. The client(s) 910 can be hardware and/or software (e.g., threads, processes, computing devices). The system 900 also includes one or more server(s) 930. Thus, system 900 can correspond to a two-tier client server model or a multi-tier model (e.g., client, middle tier server, data server), amongst other models. The server(s) 930 can also be hardware and/or software (e.g., threads, processes, computing devices). The servers 930 can house threads to perform transformations by employing the subject disclosure, for example. One possible communication between a client 910 and a server 930 may be in the form of a data packet transmitted between two or more computer processes.

The system 900 includes a communication framework 950 that can be employed to facilitate communications between the client(s) 910 and the server(s) 930. The client(s) 910 are operatively connected to one or more client data store(s) 920 that can be employed to store information local to the client(s) 910. Similarly, the server(s) 930 are operatively connected to one or more server data store(s) 940 that can be employed to store information local to the servers 930.

It is to be appreciated and understood that components (e.g., holographic generation system, holographic processor component, hologram generator component, sensor component, processor component, data store), as described with regard to a particular system or method, can include the same or similar functionality as respective components (e.g., respectively named components or similarly named components) as described with regard to other systems or methods disclosed herein.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As utilized herein, terms "component," "system," and the like, can refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

Furthermore, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein can encompass a computer program accessible from any computer-readable device, carrier, or media. For example, computer readable media can include, but is not limited to, magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). As used and defined herein, the term "computer-readable storage device" excludes transitory storage media. Of course, those skilled in the art will recognize many modifications can be made to this configuration without departing from the scope or spirit of the disclosed subject matter.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a graphics processing unit (GPU), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

In this disclosure, terms such as "store," "storage," "data store," "data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM)). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or methods herein are intended to include, without being limited to including, these and any other suitable types of memory.

Some portions of the detailed description have been presented in terms of algorithms and/or symbolic representations of operations on data bits within a computer memory. These algorithmic descriptions and/or representations are the means employed by those cognizant in the art to effectively convey the substance of their work to others equally skilled. An algorithm is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the foregoing discussion, it is appreciated that throughout the disclosed subject matter, discussions utilizing terms such as processing, computing, calculating, determining, and/or displaying, and the like, refer to the action and processes of computer systems, and/or similar consumer and/or industrial electronic devices and/or machines, that manipulate and/or transform data represented as physical (electrical and/or electronic) quantities within the computer's and/or machine's registers and memories into other data similarly represented as physical quantities within the machine and/or computer system memories or registers or other such information storage, transmission and/or display devices.

What has been described above includes examples of aspects of the disclosed subject matter. It is, of course, not possible to describe every conceivable combination of components or methods for purposes of describing the disclosed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has," or "having," or variations thereof, are used in either the detailed description or the claims, such terms are intended to be inclusive in a manner similar to the term "comprising" as "comprising" is interpreted when employed as a transitional word in a claim.

What is claimed is:

1. A system, comprising:
    at least one memory that stores executable components; and
    at least one processor that executes or facilitates execution of the executable components, comprising:
        a detector component that detects a set of signals associated with brain activity of a brain of a user, wherein the set of signals comprises at least a first signal associated with a first frequency band and a second signal associated with a second frequency band; and
        a holographic processor component that determines a set of optical parameters of the optical setting of a hologram and controls the set of optical parameters of the optical setting of the hologram, based at least in part on a result of an analysis of the set of signals that indicates a first signal strength of the first signal associated with the first frequency band with respect to the user and a second signal strength of the second signal associated with the second frequency band with respect to the user at a given time, to generate a processed hologram for presentation to the user, wherein the processed hologram represents an object scene, and wherein the set of optical parameters comprise at least one of a focus parameter, a zoom parameter, or a three-dimensional effect parameter relating to the optical setting of the hologram to facilitate the generation of the processed hologram.

2. The system of claim 1, wherein the holographic processor component analyzes the set of signals and the hologram to facilitate determining the set of optical parameters of the optical setting.

3. The system of claim 2, wherein the holographic processor component determines the set of optical parameters of the optical setting based at least in part on the result of the analysis of the set of signals and another result of the analysis of the hologram.

4. The system of claim 3, wherein the holographic processor component facilitates application of the set of optical parameters of the optical setting to the hologram to facilitate the generation of the processed hologram.

5. The system of claim 2, wherein the holographic processor component determines respective signal strengths of respective signals of the set of signals in respective frequency bands based at least in part on the result of the analysis of the set of signals, and wherein the respective signal strengths comprise the first signal strength and the second signal strength.

6. The system of claim 1, wherein the holographic processor component adjusts one or more optical parameters of the set of optical parameters to adjust the optical setting to adjust one or more visual characteristics associated with the hologram to facilitate the generation of the processed hologram to facilitate enhancement of a viewing pleasure of the user as the user views the processed hologram.

7. The system of claim 6, wherein, based at least in part on the result of the analysis of the set of signals, the holographic processor component adjusts the one or more optical parameters to facilitate the adjustment of the one or more visual characteristics associated with the hologram to reflect, and in response to, at least one of an emotional state of the user, a mental state of the user, or a physical state of the user as determined by the holographic processor component based at least in part on respective signal strengths of the respective signals in the respective frequency bands, and wherein the respective signal strengths comprise the first signal strength and the second signal strength.

8. The system of claim 6, wherein, based at least in part on the result of the analysis of the set of signals, to facilitate the generation of the processed hologram, the holographic processor component adjusts the one or more optical parameters to facilitate the adjustment of the one or more visual characteristics associated with the hologram to at least one of modify a visual quality of the hologram, modify a size of the hologram, modify a brightness level of the hologram, modify a contrast level of the hologram, modify an intensity of a three-dimensional effect of the hologram, modify a zoom level of all or a portion of a reconstructed object scene associated with the hologram that represents the object scene, modify a focal distance of an image from the hologram with regard to a viewpoint of the user with respect to the hologram, modify a focus of a reconstructed holographic image associated with the hologram, modify an overall distance between the object scene and the hologram, modify a depth range of the object scene associated with the hologram, or modify at least one of horizontal parallax or vertical parallax of the hologram.

9. The system of claim 1, wherein the holographic processor component determines that the first signal associated with the first frequency band has the first signal strength and the second signal associated with the second frequency band has the second signal strength.

10. The system of claim 9, wherein the holographic processor component determines a first optical parameter of the set of optical parameters based at least in part on the first signal strength associated with the first frequency band, and determines a second optical parameter of the set of optical parameters based at least in part on the second signal strength associated with the second frequency band.

11. The system of claim 1, further comprising a hologram generator component that is associated with the holographic processor component, wherein the hologram generator component generates the hologram representing the object scene, and facilitates the generation of the processed hologram based at least in part on the set of optical parameters of the optical setting applied to the hologram.

12. The system of claim 1, further comprising a display component that presents one or more reconstructed holographic images associated with the processed hologram to the user, in response to illumination of the processed hologram with a coherent light beam.

13. The system of claim 12, wherein the display component comprises or is associated with at least one of a head mount display device comprising communication and display functionality, a mobile phone, a computer, an electronic pad or tablet, or an electronic gaming device.

14. The system of claim 13, wherein the head mount display device comprises electronic glasses.

15. The system of claim 13, further comprising a sensor component comprising a set of sensor sub-components that sense brain wave signals based at least in part on the brain activity of the user, and communicates the set of signals to the holographic processor component, wherein the set of signals are determined based at least in part on the brain wave signals.

16. The system of claim 15, wherein one or more sensor sub-components of the sensor component are attached to or integrated with the head mount display device to facilitate the sensing of the brain wave signals.

17. The system of claim 15, wherein a subset of the set of sensor sub-components sense a physical response of the user in response to viewing at least one of the hologram or the processed hologram, or in response to experiencing stimuli in connection with viewing at least one of the hologram or the processed hologram.

18. A method, comprising:
receiving, by a system comprising a processing device, information relating to a set of brain wave signals associated with brain activity of a user, wherein the set of brain wave signals comprises at least a first brain wave signal associated with a first frequency band and a second brain wave signal associated with a second frequency band;
controlling, by the system, a set of parameters of an optical setting of a hologram, based at least in part on a result of an analysis of the information relating to the set of brain wave signals, to generate a modified hologram for presentation to the user, wherein the modified hologram represents an object scene, and wherein the result comprises a first signal strength of the first brain wave signal associated with the first frequency band with respect to the user and a second signal strength of the second brain wave signal associated with the second frequency band with respect to the user at a particular time; and
determining, by the system, the set of parameters of the optical setting of the hologram, based at least in part on the result of the analysis of the information relating to the set of brain wave signals, wherein the set of parameters of the optical setting are used to manage a set of visual attributes comprising at least one of a focus attribute, a zoom attribute, or a three-dimensional effect attribute associated with the hologram to facilitate generating the modified hologram.

19. The method of claim 18, further comprising:
monitoring, by the system, the set of brain wave signals associated with the brain activity of the user; and
sensing the set of brain wave signals, wherein the sensing the set of brain wave signals comprises sensing changes in the set of brain wave signals associated with the brain activity of the user in response to presentation of at least one of the hologram or the modified hologram to the user.

20. The method of claim 18, wherein the first brain wave signal associated with the first frequency band is an alpha wave signal and the second brain wave signal associated with the second frequency band is a beta wave signal.

21. The method of claim 18, further comprising:
analyzing, by the system, the information relating to the set of brain wave signals and the hologram to facilitate the determining of the set of parameters of the optical setting to use to facilitate modifying the hologram to generate the modified hologram.

22. The method of claim 18, wherein the determining the set of parameters of the optical setting of the hologram comprises determining the set of parameters of the optical setting to apply to the hologram based at least in part on the result of the analysis of the information relating to the set of brain wave signals and another result of a different analysis of the hologram.

23. The method of claim 18, further comprising:
modifying, by the system, at least one visual attribute, of the set of visual attributes, of the hologram, based at least in part on the set of parameters of the optical setting of the hologram, to facilitate generating the modified hologram.

24. The method of claim 23, wherein the at least one visual attribute comprises or relates to at least one of a visual quality of the hologram, a size of the hologram, a brightness level of the hologram, a contrast level of the hologram, an intensity of a three-dimensional effect of the hologram, a zoom level of all or a portion of a reconstructed object scene associated with the hologram that represents the object scene, a focal distance of an image from the hologram in relation to a viewpoint of the user with respect to the hologram, a focus of a reconstructed holographic image associated with the hologram, an overall distance between the object scene and the hologram, a depth range of the object scene associated with the hologram, a horizontal parallax associated with the hologram, or a vertical parallax associated with the hologram.

25. The method of claim 18, further comprising:
determining, by the system, respective signal strengths of respective brain wave signals of the set of brain wave signals based at least in part on the result of the analysis of the information relating to the set of brain wave signals, wherein the respective signal strengths comprise the first signal strength and the second signal strength.

26. The method of claim 18, further comprising:
determining, by the system, the first signal strength of the first brain wave signal associated with the first frequency band;
determining, by the system, the second signal strength of the second brain wave signal associated with the second frequency band;
determining, by the system, a first parameter of the set of parameters of the optical setting based at least in part on the first signal strength associated with the first frequency band; and
determining, by the system, a second parameter of the set of parameters of the optical setting based at least in part on the second signal strength associated with the second frequency band.

27. The method of claim 26, further comprising:
applying, by the system, the first parameter and the second parameter to one or more visual attributes of the hologram to facilitate the generating of the modified hologram, wherein the set of visual attributes comprises the one or more visual attributes.

28. The method of claim 18, further comprising:
generating, by the system, one or more reconstructed holographic images based at least in part on the modified hologram; and
displaying, by the system, the one or more reconstructed holographic images on a display device to facilitate presenting the one or more reconstructed holographic images to the user.

29. The method of claim 18, wherein the modified hologram is a three-dimensional full-parallax hologram comprising horizontal parallax and vertical parallax, and the object scene is a three-dimensional object scene.

30. A non-transitory computer-readable medium storing computer-executable instructions that, in response to execution, cause a system comprising a processor to perform operations, comprising:
detecting a set of signals associated with brain activity of a brain of a user, wherein the set of signals comprises at least a first signal associated with a first frequency band and a second signal associated with a second frequency band;
managing a set of parameters of an optical setting of a hologram, based at least in part on a result of an analysis of the set of signals that relates to a first signal level of the first signal associated with the first frequency band with respect to the user and a second signal level of the second signal associated with the second frequency band with respect to the user at a given time, to generate a modified hologram for presentation to the user, wherein the modified hologram represents an object scene; and
determining the set of parameters of the optical setting of the hologram based at least in part on the result of the analysis of the set of signals, wherein the set of parameters of the optical setting are used to facilitate adjusting a set of visual characteristics associated with the hologram to facilitate generating the modified hologram.

31. The non-transitory computer-readable medium of claim 30, wherein the operations further comprise:
analyzing the set of signals and the hologram to facilitate determining the set of parameters of the optical setting;
determining at least the first signal level of the first signal associated with the first frequency band and the second signal level of the second signal associated with the second frequency band based at least in part on the result of the analyzing the signals; and
translating the first signal level and the second signal level to one or more parameters of the set of parameters of the optical setting based at least in part on a mapping of respective signals strengths of signals in respective frequency bands to parameters for optical settings, wherein the determining the set of parameters comprises determining the set of parameters of the optical setting based at least in part on the translating; and
applying the one or more parameters of the set of parameters of the optical setting to facilitate adjusting one or more visual characteristics associated with the hologram to facilitate generating the modified hologram, wherein the set of visual characteristics comprises the one or more visual characteristics.

32. A system, comprising:
means for receiving information relating to a set of brain wave signals associated with brain activity of a user, wherein the set of brain wave signals comprises at least a first brain wave signal associated with a first frequency band and a second brain wave signal associated with a second frequency band;
means for controlling a set of parameters of an optical setting of a hologram, based at least in part on a result of an analysis of the information relating to the set of brain wave signals, to generate a processed hologram for presentation to the user, wherein the processed hologram represents an object scene, and wherein the result relates to a first signal strength of the first brain wave signal associated with the first frequency band with respect to the user and a second signal strength of the second brain wave signal associated with the second frequency band with respect to the user at a particular time;
means for determining the set of parameters of the optical setting of the hologram based at least in part on the result of the analysis of the information relating to the set of brain wave signals; and
means for adjusting one or more visual characteristics associated with the hologram, based at least in part on one or more parameters of the set of parameters of the optical setting of the hologram, to facilitate generating the processed hologram.

33. The system of claim 32, wherein the system further comprises:
means for analyzing the information relating to the set of brain wave signals to generate the result of the analysis of the information, to facilitate determining the set of parameters of the optical setting of the hologram.

* * * * *